(12) United States Patent
Lemay et al.

(10) Patent No.: US 10,572,142 B2
(45) Date of Patent: *Feb. 25, 2020

(54) PORTABLE ELECTRONIC DEVICE FOR INSTANT MESSAGING

(71) Applicant: Apple Inc., Cupertino, CA (US)

(72) Inventors: Stephen O. Lemay, Palo Alto, CA (US); Marcel Van Os, San Francisco, CA (US); Scott Herz, San Jose, CA (US); Greg Christie, San Jose, CA (US)

(73) Assignee: Apple Inc., Cupertino, CA (US)

(*) Notice: Subject to any disclaimer, the term of this patent is extended or adjusted under 35 U.S.C. 154(b) by 178 days.

This patent is subject to a terminal disclaimer.

(21) Appl. No.: 15/464,248

(22) Filed: Mar. 20, 2017

(65) Prior Publication Data
US 2017/0255359 A1 Sep. 7, 2017

Related U.S. Application Data

(63) Continuation of application No. 14/963,044, filed on Dec. 8, 2015, now Pat. No. 9,600,174, which is a
(Continued)

(51) Int. Cl.
G06F 3/0488 (2013.01)
G06F 3/01 (2006.01)
(Continued)

(52) U.S. Cl.
CPC .......... G06F 3/0488 (2013.01); G06F 3/017 (2013.01); G06F 3/0482 (2013.01);
(Continued)

(58) Field of Classification Search
CPC .... G06F 3/0481; G06F 3/0482; G06F 3/0484; G06F 3/0486; G06F 3/04812;
(Continued)

(56) References Cited

U.S. PATENT DOCUMENTS 4,107,784 A 8/1978 Van Bemmelen
4,433,377 A 2/1984 Eustis et al.
(Continued)

FOREIGN PATENT DOCUMENTS

EP 0464712 A2 1/1992
EP 0880091 A2 11/1998
(Continued)

OTHER PUBLICATIONS

Notice of Allowance received for Japanese Patent Application No. 2015-083693, dated Apr. 13, 2018, 4 pages (1 page of English Translation and 3 pages of Official copy).
(Continued)

Primary Examiner — Steven P Sax
(74) Attorney, Agent, or Firm — Dentons US LLP

(57) ABSTRACT

A portable electronic device for instant messaging is disclosed. One aspect of the invention involves a graphical user interface (GUI) on a portable electronic device with a touch screen display. The GUI has a set of messages exchanged between a user of the device and another person. The set of messages are displayed in a chronological order. In response to detecting a scrolling gesture comprising a substantially vertical movement of a user contact with the touch screen display, the display of messages are scrolled in accordance with a direction of the scrolling gesture. The detecting of the scrolling gesture is substantially independent of a horizontal position of the user contact with the touch screen display.

15 Claims, 32 Drawing Sheets

Related U.S. Application Data continuation of application No. 11/848,208, filed on Aug. 30, 2007, now Pat. No. 9,304,675.

(60) Provisional application No. 60/937,993, filed on Jun. 29, 2007, provisional application No. 60/946,969, filed on Jun. 28, 2007, provisional application No. 60/879,469, filed on Jan. 8, 2007, provisional application No. 60/883,819, filed on Jan. 7, 2007, provisional application No. 60/879,253, filed on Jan. 7, 2007, provisional application No. 60/824,769, filed on Sep. 6, 2006.

(51) Int. Cl.
| | | |
|---|---|---|
| *G06F 3/0487* | (2013.01) | |
| *G06Q 10/10* | (2012.01) | |
| *H04L 12/58* | (2006.01) | |
| *G06F 3/0485* | (2013.01) | |
| *H04M 1/2745* | (2020.01) | |
| *H04M 1/725* | (2006.01) | |
| *G06F 3/0482* | (2013.01) | |
| *G06F 3/0481* | (2013.01) | |
| *G06F 3/0484* | (2013.01) | |

(52) U.S. Cl.
CPC .......... *G06F 3/0485* (2013.01); *G06F 3/0487* (2013.01); *G06F 3/04817* (2013.01); *G06F 3/04842* (2013.01); *G06F 3/04847* (2013.01); *G06F 3/04855* (2013.01); *G06Q 10/10* (2013.01); *H04L 51/04* (2013.01); *H04L 51/043* (2013.01); *H04L 51/16* (2013.01); *H04M 1/27455* (2013.01); *H04M 1/7258* (2013.01); *H04M 1/72522* (2013.01); *H04M 1/72552* (2013.01); *H04M 1/274525* (2013.01); *H04M 2250/12* (2013.01); *H04M 2250/22* (2013.01); *H04M 2250/70* (2013.01)

(58) Field of Classification Search
CPC . G06F 3/017; G06F 16/958; G09G 2340/145; G06Q 10/107; H04M 1/27; H04M 1/72; H04M 22/50; H04M 22/12; H04M 22/22; H04M 22/70
See application file for complete search history.

(56) References Cited

U.S. PATENT DOCUMENTS

| | | | |
|---|---|---|---|
| 4,485,439 A | 11/1984 | Rothstein | |
| 4,513,379 A | 4/1985 | Wilson et al. | |
| 4,555,775 A | 11/1985 | Pike | |
| 4,586,158 A | 4/1986 | Brandle | |
| 4,642,790 A | 2/1987 | Minshull et al. | |
| 5,128,672 A | 7/1992 | Kaehler | |
| 5,276,794 A | 1/1994 | Lamb, Jr. | |
| 5,287,448 A | 2/1994 | Nicol et al. | |
| 5,428,731 A | 6/1995 | Powers, III | |
| 5,543,781 A | 8/1996 | Ganucheau, Jr. et al. | |
| 5,617,539 A | 4/1997 | Ludwig et al. | |
| 5,724,985 A | 3/1998 | Snell et al. | |
| 5,758,079 A | 5/1998 | Ludwig et al. | |
| 5,815,142 A | 9/1998 | Allard et al. | |
| 5,854,893 A | 12/1998 | Ludwig et al. | |
| 5,872,521 A | 2/1999 | Lopatukin et al. | |
| 5,880,731 A | 3/1999 | Liles et al. | |
| 5,884,039 A | 3/1999 | Ludwig et al. | |
| 5,896,500 A | 4/1999 | Ludwig et al. | |
| 5,917,487 A | 6/1999 | Ulrich | |
| 5,943,049 A | 8/1999 | Matsubara et al. | |
| 5,951,621 A | 9/1999 | Palalau et al. | |
| 5,990,887 A | 11/1999 | Redpath et al. | |
| 6,018,711 A | 1/2000 | French-St. George et al. | |
| 6,177,931 B1 | 1/2001 | Alexander et al. | |
| 6,232,966 B1 | 5/2001 | Kurlander | |
| 6,237,025 B1 | 5/2001 | Ludwig et al. | |
| 6,256,663 B1 | 7/2001 | Davis | |
| 6,268,859 B1 | 7/2001 | Andresen et al. | |
| 6,313,853 B1 | 11/2001 | Lamontagne et al. | |
| 6,351,762 B1 | 2/2002 | Ludwig et al. | |
| 6,434,604 B1 | 8/2002 | Harada et al. | |
| 6,437,818 B1 | 8/2002 | Ludwig et al. | |
| 6,583,806 B2 | 6/2003 | Ludwig et al. | |
| 6,594,673 B1 | 7/2003 | Smith et al. | |
| 6,594,688 B2 | 7/2003 | Ludwig et al. | |
| 6,630,944 B1 | 10/2003 | Kakuta et al. | |
| 6,631,186 B1 | 10/2003 | Adams et al. | |
| 6,662,023 B1 | 12/2003 | Helle | |
| 6,704,015 B1 | 3/2004 | Bovamick et al. | |
| 6,724,370 B2 | 4/2004 | Dutta et al. | |
| 6,772,195 B1 | 8/2004 | Hatlelid et al. | |
| 6,775,776 B1 | 8/2004 | Vogt et al. | |
| 6,784,901 B1* | 8/2004 | Harvey | H04L 12/1827 709/204 |
| 6,910,186 B2 | 6/2005 | Kim | |
| 6,915,138 B2 | 7/2005 | Kraft | |
| 6,932,708 B2 | 8/2005 | Yamashita et al. | |
| 6,954,902 B2 | 10/2005 | Noma et al. | |
| 7,013,429 B2 | 3/2006 | Fujimoto et al. | |
| 7,072,941 B2 | 7/2006 | Griffin et al. | |
| 7,115,035 B2 | 10/2006 | Tanaka | |
| 7,124,164 B1 | 10/2006 | Chemtob | |
| 7,133,900 B1 | 11/2006 | Szeto | |
| 7,152,093 B2 | 12/2006 | Ludwig et al. | |
| 7,206,809 B2 | 4/2007 | Ludwig et al. | |
| 7,218,943 B2* | 5/2007 | Klassen | H04L 51/16 455/412.1 |
| 7,222,306 B2* | 5/2007 | Kaasila | G06F 3/0481 715/801 |
| 7,386,799 B1 | 6/2008 | Clanton et al. | |
| 7,412,470 B2 | 8/2008 | Masuno et al. | |
| 7,423,661 B2 | 9/2008 | Abe et al. | |
| 7,433,921 B2 | 10/2008 | Ludwig et al. | |
| 7,478,129 B1 | 1/2009 | Chemtob | |
| 7,519,667 B1 | 4/2009 | Capps | |
| 7,546,536 B2 | 6/2009 | Imanishi | |
| 7,620,407 B1 | 11/2009 | Donald et al. | |
| 7,636,578 B1 | 12/2009 | Cope et al. | |
| 7,669,134 B1 | 2/2010 | Christie et al. | |
| 7,685,530 B2 | 3/2010 | Sherrard et al. | |
| 7,710,262 B2 | 5/2010 | Ruha | |
| 7,735,102 B1 | 6/2010 | Billmaier et al. | |
| 7,743,188 B2 | 6/2010 | Haitani et al. | |
| 7,877,705 B2 | 1/2011 | Chambers et al. | |
| 8,150,922 B2 | 4/2012 | Griffin et al. | |
| 8,407,603 B2 | 3/2013 | Christie et al. | |
| 8,458,278 B2 | 6/2013 | Christie et al. | |
| 8,554,861 B2 | 10/2013 | Christie et al. | |
| 8,689,147 B2 | 4/2014 | Griffin et al. | |
| 8,706,818 B2 | 4/2014 | Krzyzanowski et al. | |
| 9,304,675 B2 | 4/2016 | Lemay et al. | |
| 9,600,174 B2 | 3/2017 | Lemay et al. | |
| 2001/0005859 A1 | 6/2001 | Okuyama et al. | |
| 2002/0007395 A1 | 1/2002 | Matsuda | |
| 2002/0035467 A1 | 3/2002 | Morimoto et al. | |
| 2002/0054094 A1 | 5/2002 | Matsuda | |
| 2003/0073496 A1 | 4/2003 | D'Amico et al. | |
| 2003/0078969 A1 | 4/2003 | Sprague et al. | |
| 2003/0079024 A1 | 4/2003 | Hough et al. | |
| 2003/0097408 A1 | 5/2003 | Kageyama et al. | |
| 2003/0101450 A1 | 5/2003 | Davidsson et al. | |
| 2003/0122787 A1 | 7/2003 | Zimmerman et al. | |
| 2003/0130014 A1 | 7/2003 | Rucinski | |
| 2003/0134678 A1 | 7/2003 | Tanaka | |
| 2003/0152203 A1 | 8/2003 | Berger et al. | |
| 2003/0179222 A1 | 9/2003 | Noma et al. | |
| 2003/0187925 A1 | 10/2003 | Inala et al. | |
| 2003/0187944 A1 | 10/2003 | Johnson et al. | |
| 2003/0208756 A1 | 11/2003 | Macrae et al. | |
| 2003/0228909 A1 | 12/2003 | Tanaka et al. | |
| 2004/0015548 A1 | 1/2004 | Lee | |
| 2004/0021676 A1 | 2/2004 | Chen et al. | |

(56) References Cited

U.S. PATENT DOCUMENTS

| | | |
|---|---|---|
| 2004/0027461 A1 | 2/2004 | Boyd |
| 2004/0039779 A1 | 2/2004 | Amstrong et al. |
| 2004/0078444 A1 | 4/2004 | Malik |
| 2004/0100479 A1 | 5/2004 | Nakano et al. |
| 2004/0125088 A1* | 7/2004 | Zimmerman ....... G06F 3/04883 345/173 |
| 2004/0199663 A1 | 10/2004 | Horvitz et al. |
| 2004/0210634 A1 | 10/2004 | Ferrer et al. |
| 2004/0215731 A1 | 10/2004 | Tzann-en Szeto |
| 2004/0223485 A1 | 11/2004 | Arellano et al. |
| 2004/0259591 A1 | 12/2004 | Grams et al. |
| 2005/0086211 A1* | 4/2005 | Mayer ................... G06F 16/951 |
| 2005/0086605 A1 | 4/2005 | Ferrer et al. |
| 2005/0144568 A1 | 6/2005 | Gruen et al. |
| 2005/0156947 A1* | 7/2005 | Sakai .................... G06F 17/214 345/629 |
| 2005/0162402 A1 | 7/2005 | Watanachote |
| 2005/0169213 A1 | 8/2005 | Scian et al. |
| 2005/0181821 A1 | 8/2005 | Elomaa |
| 2005/0210394 A1 | 9/2005 | Crandall et al. |
| 2005/0278643 A1 | 12/2005 | Ukai et al. |
| 2006/0001652 A1 | 1/2006 | Chiu et al. |
| 2006/0026233 A1 | 2/2006 | Tenembaum et al. |
| 2006/0061545 A1 | 3/2006 | Hughes et al. |
| 2006/0128404 A1 | 6/2006 | Klassen et al. |
| 2006/0152496 A1 | 7/2006 | Knaven |
| 2006/0156245 A1 | 7/2006 | Williams et al. |
| 2006/0168285 A1* | 7/2006 | Nielsen ................. G06F 16/958 709/231 |
| 2006/0168539 A1 | 7/2006 | Hawkins et al. |
| 2006/0174207 A1 | 8/2006 | Deshpande |
| 2006/0184886 A1 | 8/2006 | Chung et al. |
| 2006/0200528 A1* | 9/2006 | Pathiyal ............... G06Q 10/107 709/206 |
| 2006/0205432 A1* | 9/2006 | Hawkins ........... H04M 1/27455 455/552.1 |
| 2006/0253787 A1* | 11/2006 | Fogg ..................... G06F 3/0481 715/752 |
| 2006/0277574 A1 | 12/2006 | Schein et al. |
| 2007/0033626 A1 | 2/2007 | Yang et al. |
| 2007/0083623 A1 | 4/2007 | Nishimura et al. |
| 2007/0097083 A1 | 5/2007 | Seok |
| 2007/0132738 A1 | 6/2007 | Lowles et al. |
| 2007/0132789 A1 | 6/2007 | Ording et al. |
| 2007/0150830 A1 | 6/2007 | Ording et al. |
| 2007/0162589 A1 | 7/2007 | Riddle |
| 2007/0173267 A1 | 7/2007 | Klassen et al. |
| 2007/0176898 A1 | 8/2007 | Suh |
| 2007/0182595 A1 | 8/2007 | Ghasabian |
| 2007/0213099 A1 | 9/2007 | Bast |
| 2007/0219857 A1 | 9/2007 | Seymour et al. |
| 2007/0226652 A1 | 9/2007 | Kikuchi et al. |
| 2007/0262951 A1 | 11/2007 | Huie et al. |
| 2007/0271527 A1 | 11/2007 | Paas et al. |
| 2007/0300140 A1 | 12/2007 | Makela et al. |
| 2008/0042978 A1 | 2/2008 | Perez-Noguera |
| 2008/0055269 A1 | 3/2008 | Lemay et al. |
| 2008/0059578 A1 | 3/2008 | Albertson et al. |
| 2008/0078758 A1 | 4/2008 | Shimura et al. |
| 2008/0094371 A1 | 4/2008 | Forstall et al. |
| 2008/0114841 A1 | 5/2008 | Lambert |
| 2008/0122796 A1 | 5/2008 | Jobs et al. |
| 2008/0177994 A1* | 7/2008 | Mayer ................... G06F 9/4418 713/2 |
| 2008/0222118 A1 | 9/2008 | Scian et al. |
| 2008/0268901 A1 | 10/2008 | Miramontes |
| 2008/0310602 A1 | 12/2008 | Bhupati |
| 2009/0005011 A1 | 1/2009 | Christie et al. |
| 2009/0007001 A1* | 1/2009 | Morin ................... G06F 3/0237 715/773 |
| 2009/0106376 A1 | 4/2009 | Tom et al. |
| 2009/0138828 A1 | 5/2009 | Schultz et al. |
| 2010/0164897 A1 | 7/2010 | Morin et al. |
| 2014/0026073 A1 | 1/2014 | Christie et al. |
| 2016/0085393 A1 | 3/2016 | Lemay et al. |
| 2018/0191646 A1 | 7/2018 | Christie et al. |
| 2018/0352072 A1 | 12/2018 | Christie et al. |

FOREIGN PATENT DOCUMENTS

| | | |
|---|---|---|
| EP | 1347361 A1 | 9/2003 |
| EP | 1517228 A2 | 3/2005 |
| JP | 9-259063 A | 10/1997 |
| JP | 9-265457 A | 10/1997 |
| JP | 10105324 A | 4/1998 |
| JP | 11-328059 A | 11/1999 |
| JP | 2000-059422 A | 2/2000 |
| JP | 2000-099225 A | 4/2000 |
| JP | 2001-125894 A | 5/2001 |
| JP | 2002-082893 A | 3/2002 |
| JP | 2002-163445 A | 6/2002 |
| JP | 2002-351789 A | 12/2002 |
| JP | 2003-233452 A | 8/2003 |
| JP | 2003-233568 A | 8/2003 |
| JP | 2004-126786 A | 4/2004 |
| JP | 2004-213548 A | 7/2004 |
| JP | 2005-050113 A | 2/2005 |
| JP | 2005-086624 A | 3/2005 |
| JP | 2005-092441 A | 4/2005 |
| JP | 2005-332340 A | 12/2005 |
| JP | 2005-339420 A | 12/2005 |
| JP | 2007-518146 A | 7/2007 |
| JP | 2008-508600 A | 3/2008 |
| WO | 98/33111 A1 | 7/1998 |
| WO | 03/056789 A1 | 7/2003 |
| WO | 2004/104758 A2 | 12/2004 |
| WO | 2006/020304 A2 | 2/2006 |
| WO | 2006020305 A2 | 2/2006 |

OTHER PUBLICATIONS

Office Action received for Japanese Patent Application No. 2015-083693, dated Sep. 29, 2017, 7 pages (4 pages of English Translation and 3 pages of Official Copy).

Non-Final Office Action received for U.S. Appl. No. 15/714,783, dated Jun. 27, 2018, 14 pages.

Notice of Allowance received for U.S. Appl. No. 15/714,783, dated Dec. 4, 2018, 7 pages.

Corrected Notice of Allowance received for U.S. Appl. No. 12/163,908, dated Feb. 22, 2018, 8 pages.

Decision to Refusal received for European Patent Application No. 07841749.0, dated Oct. 19, 2017, 9 pages.

Ishii, H., "TeamWorkStation: Towards a Seamless Shared Workspace" CSCW '90 Proceedings, Oct. 1990, 14 pages.

Notice of Allowance received for U.S. Appl. No. 12/163,908, dated Nov. 30, 2017, 13 pages.

Patterson et al., "Rendezvous: An Architecture for Synchronous Multi-User Applications", CSCW '90 Proceedings, Oct. 1990, 10 pages.

Third Party Rejection received for U.S. Appl. No. 90/013,163, dated Feb. 25, 2014, 136 pages.

Notice of Allowance received for U.S. Appl. No. 15/714,783, dated Feb. 25, 2019, 16 pages.

Office Action received for Japanese Patent Application No. 2018-012846, dated May 10, 2019, 4 pages (2 pages of English Translation and 2 pages of Official Copy).

Office Action received for European Patent Application No. 13155688.8, dated Jan. 2, 2017, 7 pages.

Summons to attend Oral proceedings received for European Patent Application No. 07841749.0, dated Mar. 6, 2017, 19 pages.

Adium, "AboutAdium-Adium X-Trac", available at <http://web.archive.org/web/20070819113247/http://trac.adiumx.com/wiki/AboutAdium>, retrieved on Nov. 25, 2011, 2 pages.

Advisory Action received for U.S. Appl. No. 13/908,998, dated Nov. 10, 2015, 3 pages.

Ahuja et al., "A Comparison of Application Sharing Mechanisms in Real-Time Desktop Conferencing Systems", At&T Bell Laboratories, 1990, pp. 238-248.

(56) References Cited

OTHER PUBLICATIONS

Apple Computer, Inc., "Welcome to Tiger", available at <http://www.maths.dundee.ac.uk/software/Welcome_to_Mac_OS_X_vr10.4_Tiger.pdf>, 2005, pp. 1-32.

Arango et al., "Touring Machine: A Software Platform for Distributed Multimedia Applications", 1992 IFIP International Conference on Upper Layer Protocols, Architectures, and Applications, May 1992, pp. 1-11.

Betts et al., "Goals and Objectives for User Interface Software", Computer Graphics, vol. 21, No. 2, Apr. 1987, pp. 73-78.

Bleher et al., "A Graphic Interactive Application Monitor", IBM Systems Journal, vol. 19, No. 3, Sep. 1980, pp. 382-402.

Borenstein et al., "Cooperative Work in the Andrew Message System", ACM Digital Library, 1988, pp. 306-323.

Bussler et al., "Web Service Execution Environment (WSMX)", retrieved from Internet on Sep. 17, 2012, available at <http://www.w3.org/Submission/WSMX>, Jun. 3, 2005, 29 pages.

Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.

Casner et al., "N-Way Conferencing with Packet Video", The Third International Workshop on Packet Video, Mar. 22-23, 1990, pp. 1-6.

Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.

Cheyer, Adam, "A Perspective on AI & Agent Technologies for SCM", VerticalNet presentation, 2001, 22 pages.

Cheyer, Adam, "About Adam Cheyer", available at <http://www.adam.cheyer.com/about.html>, retrieved on Sep. 17, 2012, pp. 1-2.

"Clear at a Glance: Microsoft Office 2004 for Mac", Nikkei BP Soft Press, Inc., 1st Edition, 5 pages.

Conklin, Jeffrey, "A Survey of Hypertext", MCC Software Technology Program, Dec. 1987, 40 pages.

Croft et al., "Task Support in an Office System", Proceedings of the Second ACM-SIGOA Conference on Office Information Systems, 1984, pp. 22-24.

Crowley et al., "MMConf: An Infrastructure for Building Shared Multimedia Applications", CSCW 90 Proceedings, Oct. 1990, pp. 329-342.

Decision to Grant received for Chinese Patent Application No. 200780041351.5, 3 pages.

Decision to Grant received for Japanese Patent Application No. 2009-527503, 3 pages.

Decision to Grant received for Japanese Patent Application No. 2012-246631, dated May 11, 2015, 6 pages.

Del Strother, Jonathan, "Coverflow", Available online at <http://www.steelskies.com/coverflow>, retrieved on Jun. 15, 2006, 14 pages.

Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.

Donahue et al., "Whiteboards: A Graphical Database Tool", ACM Transactions on Office Information Systems, vol. 4, No. 1, Jan. 1986, pp. 24-41.

Dourish et al., "Portholes: Supporting Awareness in a Distributed Work Group", Proceedings of the SIGCHI conference on Human factors in Computing Systems, May 1992, pp. 541-547.

Egido, Carmen, "Video Conferencing as a Technology to Support Group Work: A Review of its Failures", Bell Communications Research, 1988, pp. 13-24.

Elliot, Chip, "High-Quality Multimedia Conferencing Through a Long-Haul Packet Network", BBN Systems and Technologies, 1993, pp. 91-98.

Extended European Search Report (includes Partial European Search Report and European Search Opinion) received for European Patent Application No. 13155688.8, dated Aug. 22, 2013, 11 pages.

Final Office Action received for U.S. Appl. No. 10/428,523, dated Apr. 22, 2009, 22 pages.

Final Office Action received for U.S. Appl. No. 10/428,523, dated Nov. 29, 2007, 19 pages.

Final Office Action received for U.S. Appl. No. 11/688,664, dated Feb. 22, 2010, 18 pages.

Final Office Action received for U.S. Appl. No. 11/688,664, dated Mar. 15, 2011, 19 pages.

Final Office Action received for U.S. Appl. No. 11/848,208, dated Nov. 4, 2011, 5 pages.

Final Office Action received for U.S. Appl. No. 11/848,208, dated Oct. 9, 2014, 15 pages.

Final Office Action received for U.S. Appl. No. 12/163,908, dated Nov. 7, 2012, 15 pages.

Final Office Action received for U.S. Appl. No. 12/242,846, dated Jun. 5, 2012, 14 pages.

Final Office Action received for U.S. Appl. No. 12/726,247, dated Mar. 18, 2011, 28 pages.

Final Office Action received for U.S. Appl. No. 13/908,998, dated Aug. 17, 2015, 23 pages.

Fisher et al., "Virtual Environment Display System", Interactive 3D Graphics, Oct. 23-24, 1986, pp. 77-87.

Forsdick, Harry, "Explorations into Real-Time Multimedia Conferencing", Proceedings of the Ifip Tc 6 International Symposium on Computer Message Systems, 1986, pp. 331-347.

Gardner, Jr., P. C., "A System for the Automated Office Environment", IBM Systems Journal, vol. 20, No. 3, 1981, pp. 321-345.

Gaver et al., "One Is Not Enough: Multiple Views in a Media Space", INTERCHI, Apr. 24-29, 1993, pp. 335-341.

Gaver et al., "Realizing a Video Environment: EuroPARC's RAVE System", Rank Xerox Cambridge EuroPARC, 1992, pp. 27-35.

GMAIL, "About Group Chat", available at <http://mailgoogle.com/support/bin/answer.py?answer=81090>, Nov. 26, 2007, 2 pages.

Good et al., "Building a User-Derived Interface", Communications of the ACM; (Oct. 1984) vol. 27, No. 10, Oct. 1984, pp. 1032-1043.

Gruhn et al., "A Research Perspective on Computer-Assisted Office Work", IBM Systems Journal, vol. 18, No. 3, 1979, pp. 432-456.

Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.

Halbert, D. C., "Programming by Example", Dept. Electrical Engineering and Comp. Sciences, University of California, Berkley, Nov. 1984, 81 pages.

Hill, R. D., "Some Important Features and Issues in User Interface Management System", Dynamic Graphics Project, University of Toronto, CSRI, vol. 21, No. 2, Apr. 1987, pp. 116-120.

Hiroshi, "TeamWork Station: Towards a Seamless Shared Workspace", NTT Human Interface Laboratories, CSCW 90 Proceedings, Oct. 1990, pp. 13-26.

Hopper, Andy, "Pandora—An Experimental System for Multimedia Applications", Olivetti Research Laboratory, Apr. 1990, pp. 19-34.

Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.

Huang et al., "Real-Time Software-Based Video Coder for Multimedia Communication Systems", Department of Computer Science and Information Engineering, 1993, pp. 1-10.

ICHAT AV, "Video Conferencing for the Rest of Us", Apple—Mac OS X-iChat AV, available at <http://www.apple.com/macosx/features/ichat/html>, retrieved on Apr. 13, 2006, 3 pages.

International Preliminary Report on Patentability received for PCT Patent Application No. PCT/US2007/077424, dated Mar. 10, 2009, 9 pages.

International Search Report and Written Opinion received for PCT Patent Application No. PCT/US2007/077424, dated Jun. 19, 2008, 13 pages.

Invitation to Pay Additional Fees and Partial Search Report received for PCT Application No. PCT/US2007/077424, dated Apr. 29, 2008, 6 pages.

(56) References Cited

OTHER PUBLICATIONS

IPHONE Hacks, "Native iPhone MMS Application Released", available at <http://www.iphonehacks.com/2007/12/iphone-mms-app.html>, retrieved on Dec. 25, 2007, 5 pages.
IPHONECHAT, "iChat for iPhone in JavaScript", available at <http://www.publictivity.com/iPhoneChat/>, retrieved on Dec. 25, 2007, 2 pages.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 1-16.
Kaeppner et al., "Architecture of HeiPhone: A Testbed for Audio/Video Teleconferencing", IBM European Networking Center, 1993, 51 pages.
Kirstein et al., "Piloting of Multimedia Integrated Communications for European Researchers", Proc. INET '93, 1993, pp. 1-12.
Kjelldahl et al., "Multimedia—Principles, Systems, and Applications", Proceedings of the 1991 Eurographics Workshop on Multimedia Systems, Applications, and Interaction, Apr. 1991, 14 pages.
Kurlander et al., "Comic Chat", [Online], 1996 [Retrieved on: Feb 4, 2013], SIGGRAPH '96 Proceedings of the 23rd annual conference on Computer graphics and interactive techniques, 1996, pp. 225-236.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", Department of Computer Science, Stanford University, 1986, pp. 267-275.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Manual for Applications FOMA P900i, NTT DoCoMo Group, 6th. Edition, Sep. 2004, 13 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Morland, D. Verne, "Human Factors Guidelines for Terminal Interface Design", Communications of the ACM vol. 26, No. 7, Jul. 1983, pp. 484-494.
Morris et al., "Andrew: A Distributed Personal Computing Environment", Communications of the ACM, (Mar. 1986); vol. 29 No. 3, Mar. 1986, pp. 184-201.
Muller et al., "CSCW'92 Demonstrations", 1992, pp. 11-14.
Non Final Office Action received for U.S. Appl. No. 13/908,998, dated Mar. 3, 2015, 26 pages.
Non-Final Office Action received for U.S. Appl. No. 10/428,523, dated Apr. 12, 2007, 11 pages.
Non-Final Office Action received for U.S. Appl. No. 10/428,523, dated Jul. 9, 2008, 19 pages.
Non-Final Office Action received for U.S. Appl. No. 11/688,664, dated Jul. 19, 2012, 16 pages.
Non-Final Office Action received for U.S. Appl. No. 11/688,664, dated Jul. 22, 2009, 16 pages.
Non-Final Office Action received for U.S. Appl. No. 11/688,664, dated Sep. 29, 2010, 23 pages.
Non-Final Office Action received for U.S. Appl. No. 11/848,208, dated Dec. 23, 2013, 13 pages.
Non-Final Office Action received for U.S. Appl. No. 11/848,208, dated Apr. 1, 2011, 8 pages.
Non-Final Office Action received for U.S. Appl. No. 12/163,908, dated Jun. 13, 2012, 17 pages.
Non-Final Office Action received for U.S. Appl. No. 12/242,846, dated Oct. 19, 2011, 17 pages.
Non-Final Office Action received for U.S. Appl. No. 12/726,247, dated Jul. 18, 2012, 23 pages.
Non-Final Office Action received for U.S. Appl. No. 12/726,247, dated Sep. 28, 2010, 27 pages.
Non-Final Office Action received for U.S. Appl. No. 14/963,044, dated May 9, 2016, 9 pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
Notice of Allowance received for Canadian Patent Application No. 2,661,886, dated Jan. 7, 2014, 1 page.
Notice of Allowance received for Chinese Patent Application No. 201310169099.3, dated May 11, 2016, 4 pages.
Notice of Allowance received for U.S. Appl. No. 12/242,846, dated Dec. 7, 2012, 9 pages.
Notice of Allowance received for U.S. Appl. No. 12/242,846, dated Feb. 5, 2013, 9 pages.
Notice of Allowance received for U.S. Appl. No. 10/428,523, dated Oct. 5, 2009, 10 pages.
Notice of Allowance received for U.S. Appl. No. 11/688,664, dated Feb. 8, 2013, 12 pages.
Notice of Allowance received for U.S. Appl. No. 11/848,208, dated Jan. 15, 2016, 14 pages.
Notice of Allowance received for U.S. Appl. No. 12/726,247, dated Feb. 8, 2013, 10 pages.
Notice of Allowance received for U.S. Appl. No. 12/726,247, dated May 30, 2013, 10 pages.
Notice of Allowance received for U.S. Appl. No. 14/963,044, dated Nov. 7, 2016, 8 pages.
Notice of Intent to Issue a Reexam Certificate received for U.S. Appl. No. 90/013,163, dated Jan. 29, 2015, 22 pages.
Notice of Restriction Requirement received for U.S. Appl. No. 10/428,523, dated Dec. 29, 2006, 4 pages.
Office Action received for Canadian Patent Application No. 2,661,886, dated Nov. 7, 2011, 3 pages.
Office Action received for Canadian Patent Application No. 2,661,886, dated Jul. 14, 2010, 3 pages.
Office Action received for Chinese Patent Application No. 200780041351.5, dated Nov. 3, 2011, 14 pages.
Office Action received for Chinese Patent Application No. 200780041351.5, dated Dec. 6, 2010, 5 pages.
Office Action received for Chinese Patent Application No. 200780041351.5, dated Aug. 3, 2012, 6 pages.
Office Action received for Chinese Patent Application No. 201310169099.3, dated Dec. 7, 2015, 6 pages.
Office Action received for Chinese Patent Application No. 2013101690993, dated Jul. 2, 2015, 15 pages.
Office Action received for European Patent Application No. 07841749.0, dated Feb. 18, 2011, 4 pages.
Office Action received for European Patent Application No. 07841749.0, dated Nov. 14, 2012, 5 pages.
Office Action received for Japanese Patent Application No. 2009-527503, dated Sep. 16, 2011, 7 pages.
Office Action received for Japanese Patent Application No. 2012-246631, dated Nov. 18, 2013, 4 pages.
Office Action received for Japanese Patent Application No. 2012-246631, dated Oct. 17, 2014, 5 pages.
Office Action Received for Japanese Patent Application No. 2015-083693, dated Jan. 25, 2016, 7 pages.
Office Action received for Japanese Patent Application No. 2015-083693, dated Nov. 7, 2016, 5 pages.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Palay et al., "The Andrew Toolkit: An Overview", Information Technology Center, Carnegie-Mellon University, 1988, pp. 1-15.
Palm User Guide, 2005-2007, 755 pages.
Palm, Inc., "User Guide : Your Palm Treo.TM 755p Smartphone", 2005-2007, 304 pages.

(56) References Cited

OTHER PUBLICATIONS

Patterson et al., "Rendezvous: An Architecture for Synchronous Multi-User Applications", CSCW '90 Proceedings, 1990, pp. 317-328.
Pearl, Amy, "System Support for Integrated Desktop Video Conferencing", Sunmicrosystems Laboratories, Dec. 1992, pp. 1-15.
Phillips, Dick, "The Multi-Media Workstation", SIGGRAPH '89 Panel Proceedings, 1989, pp. 93-109.
Raper, Larry K., "The C-MU PC Server Project", (CMU-ITC-86-051), Dec. 1986, pp. 1-30.
Reexam Non-Final Office Action received for U.S. Appl. No. 90/013,163, dated Aug. 1, 2014, 45 pages.
Request for Ex Parte Reexamination, received for U.S. Appl. No. 90/013,163, filed Feb. 25, 2014, 265 pages.
Roddy et al., "Communication and Collaboration in a Landscape of B2B eMarketplaces", VerticalNet Solutions, A Business White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root, Robert, "Design of a Multi-Media Vehicle for Social Browsing", Bell Communications Research, 1988, pp. 25-38.
Rosenberg et al., "An Overview of the Andrew Message System", Information Technology Center Carnegie-Mellon University, Jul. 1987, pp. 99-108.
Scheifler, R. W., "The XWindow System", MIT Laboratory for Computer Science and Gettys, Jim Digital Equipment Corporation and MIT Project Athena; ACM Transactions on Graphics, vol. 5, No. 2, Apr. 1986, pp. 79-109.
Schooler, et al., "A Packet-switched Multimedia Conferencing System", By Eve Schooler, et al; ACM Sigois Bulletin, vol. 1, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Journal of Multimedia Systems, vol. 1, No. 1, Aug. 1993, 11 pages.
Schooler, Eve, "A Distributed Architecture for Multimedia Conference Control", ISI Research Report, Nov. 1991, pp. 1-18.
Smith et al., "Guidelines for Designing User Interface Software", User Lab, Inc., Aug. 1986, pp. 1-384.
Srinivas et al., "Monet: A Multi-Media System for Conferencing and Application Sharing in Distributed Systems", CERC Technical Report Series Research Note, Feb. 1992, 19 pages.
Summon to Attend Oral Proceedings received for European Patent Application No. 07841749.0, mailed on Jun. 21, 2016, 12 pages.
Supplemental Non-Final Office Action received for U.S. Appl. No. 11/848,208, 15 pages.
Supplemental Non-Final Office Action received for U.S. Appl. No. 11/848,208, dated Apr. 20, 2011, 17 pages.
Tidwell, Jenifer, "Animated Transition", Designing Interfaces, Patterns for effective Interaction Design, First Edition, Nov. 2005, 4 pages.
Tidwell, Jenifer, "Animated Transition", from Designing Interfaces, O'Reilly Media, Inc. Available at <http://designinginterfaces.com/Animated Transition>, Nov. 2005, 2 pages.
Touch, Joseph, "Zoned Analog Personal Teleconferencing", USC / Information Sciences Institute, 1993, pp. 1-19.
Trigg et al., "Hypertext Habitats: Experiences of Writers in NoteCards", Hypertext '87 Papers; Intelligent Systems Laboratory, Xerox Palo Alto Research Center, 1987, pp. 89-108.
Trowbridge, David, "Using Andrew for Development of Educational Applications", Center for Design of Educational Computing, Carnegie-Mellon University (CMU-ITC-85-065), Jun. 2, 1985, pp. 1-6.
Turlem, Thierry, "The INRIA Videoconferencing System (IVS)", Oct. 1994, pp. 1-7.
Viegas et al., "Chat Circles", SIGCHI Conference on Human Factors in Computing Systems, May 15-20, 1999, pp. 9-16.
Wadlow, M. G., "The Role of Human Interface Guidelines in the Design of Multimedia Applications", Carnegie Mellon University (to be Published in Current Psychology: Research and Reviews, Summer 1990 (CMU-ITC-91-101), 1990, pp. 1-22.
Walker et al., "The LOCUS Distributed Operating System 1", University of California Los Angeles, 1983, pp. 49-70.
Watabe et al., "Distributed Multiparty Desktop Conferencing System: Mermaid", CSCW 90 Proceedings, Oct. 1990, pp. 27-38.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Zelig, "A Review of the Palm Treo 750V", available at <http://www.mtekk.com.au/Articles/tabid/54/articleType/ArticleView/articleId/769/A-Review-of-the-Palm-Treo-750v.aspx>, Feb. 5, 2007, 3 pages.
Ziegler, K, "A Distributed Information System Study", IBM Systems Journal, vol. 18, No. 3, 1979, pp. 374-401.
Non-Final Office Action received for U.S. Appl. No. 12/163,908, dated Apr. 7, 2017, 13 pages.
Office Action received for European Patent Application No. 13155688.8, dated Dec. 16, 2019, 4 pages.

* cited by examiner

PORTABLE ELECTRONIC DEVICE FOR INSTANT MESSAGING

RELATED APPLICATIONS

This application is a continuation of U.S. patent application Ser. No. 14/963,044, "Portable Electronic Device For Instant Messaging," filed Dec. 8, 2015, which is a continuation of U.S. patent application Ser. No. 11/848,208, "Portable Electronic Device for Instant Messaging," filed Aug. 30, 2007, which claims priority to U.S. Provisional Patent Application Nos. 60/937,993, "Portable Multifunction Device," filed Jun. 29, 2007; 60/946,969, "Portable Electronic Device for Instant Messaging," filed Jun. 28, 2007; 60/879,469, "Portable Multifunction Device," filed Jan. 8, 2007; 60/883,819, "Portable Electronic Device for Instant Messaging," filed Jan. 7, 2007; 60/879,253, "Portable Multifunction Device," filed Jan. 7, 2007; and 60/824,769, "Portable Multifunction Device," filed Sep. 6, 2006. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to portable devices for performing instant messaging.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions.

Some portable communication devices (e.g., mobile telephones, sometimes called mobile phones, cell phones, cellular telephones, and the like) have resorted to adding more pushbuttons, increasing the density of pushbuttons, overloading the functions of the pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Portable device-based Instant Messaging (IM) services are becoming increasingly popular. But most IM services on portable electronic devices have a rudimentary user interface. It is cumbersome to create instant messages on such devices. A user often needs to press a telephone keypad repeatedly to choose a character. It is also difficult to find and view previous instant messages. For example, it is inconvenient or even impossible for the user to view a series of previous messages with a particular user while composing a new message for that user.

Accordingly, there is a need for portable multifunction devices with more transparent and intuitive user interfaces for instant messaging that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a touch screen or a touch screen display) with a graphical user interface (GUI), one or more processors, memory and one or more modules, programs or sets of instructions stored in the memory for performing multiple functions. In some embodiments, the user interacts with the GUI primarily through finger contacts and gestures on the touch screen display. Instructions for performing instant messaging operations may be included in a computer program product configured for execution by one or more processors.

One aspect of the invention involves a computer-implemented method in which a portable electronic device with a touch screen display: displays a set of messages exchanged between a user of the device and another person in a chronological order; detects a scrolling gesture comprising a substantially vertical movement of a user contact with the touch screen display, wherein the detecting of the scrolling gesture is substantially independent of a horizontal position of the user contact with the touch screen display; and responds to the scrolling gesture by scrolling the display of messages in accordance with a direction of the scrolling gesture.

Another aspect of the invention involves a computer-implemented method in which a portable electronic device with a touch screen display: displays a list of conversations, each conversation including a set of messages exchanged between a user of the device and a respective other person; detects a scrolling gesture comprising a substantially vertical movement of a user contact with the touch screen display; and responds to the scrolling gesture by scrolling the list of conversations in accordance with a direction of the scrolling gesture, wherein the scrolling gesture is substantially independent of a horizontal position of the user contact with the touch screen display.

Another aspect of the invention involves a portable electronic device. The device includes a touch screen display, one or more processors, memory, and one or more programs. The one or more program are stored in the memory and configured to be executed by the one or more processors. The one or more programs include: instructions for displaying a set of messages exchanged between a user of the device and another person in a chronological order; instructions for detecting a scrolling gesture comprising a substantially vertical movement of a user contact with the touch screen display, wherein the detecting of the scrolling gesture is substantially independent of a horizontal position of the user contact with the touch screen display; and instructions for responding to the scrolling gesture by scrolling the display of messages in accordance with a direction of the scrolling gesture.

Another aspect of the invention involves a portable electronic device. The device includes a touch screen display, one or more processors, memory, and one or more programs. The one or more program are stored in the memory and configured to be executed by the one or more processors. The one or more programs include: instructions for displaying a list of conversations, each conversation including a set of messages exchanged between a user of the device and a respective other person; instructions for detecting a scrolling gesture comprising a substantially vertical movement of a user contact with the touch screen display; and instructions for responding to the scrolling gesture by scrolling the list of conversations in accordance with a direction of the scrolling gesture, wherein the scrolling gesture is substantially independent of a horizontal position of the user contact with the touch screen display.

Another aspect of the invention involves a computer-program product that includes a computer readable storage medium and a computer program mechanism embedded therein. The computer program mechanism includes instructions, which when executed by a portable electronic device with a touch screen display, cause the device to: display a set of messages exchanged between a user of the device and another person in a chronological order; detect a scrolling gesture comprising a substantially vertical movement of a user contact with the touch screen display, wherein the detecting of the scrolling gesture is substantially independent of a horizontal position of the user contact with the touch screen display; and respond to the scrolling gesture by scrolling the display of messages in accordance with a direction of the scrolling gesture.

Another aspect of the invention involves a computer-program product that includes a computer readable storage medium and a computer program mechanism embedded therein. The computer program mechanism includes instructions, which when executed by a portable electronic device with a touch screen display, cause the device to: display a list of conversations, each including a set of messages exchanged between a user of the device and a respective other person; detect a scrolling gesture comprising a substantially vertical movement of a user contact with the touch screen display; and respond to the scrolling gesture by scrolling the list of conversations in accordance with a direction of the scrolling gesture, wherein the scrolling gesture is substantially independent of a horizontal position of the user contact with the touch screen display.

Another aspect of the invention involves a graphical user interface (GUI) on a portable electronic device with a touch screen display. The GUI has a set of messages exchanged between a user of the device and another person. The set of messages are displayed in a chronological order. In response to detecting a scrolling gesture comprising a substantially vertical movement of a user contact with the touch screen display, wherein the detecting of the scrolling gesture is substantially independent of a horizontal position of the user contact with the touch screen display, the display of messages are scrolled in accordance with a direction of the scrolling gesture.

Another aspect of the invention involves a graphical user interface (GUI) on a portable electronic device with a touch screen display. The GUI has a list of conversations, each conversation including a set of messages exchanged between a user of the device and a respective other person. In response to detecting a scrolling gesture comprising a substantially vertical movement of a user contact with the touch screen display, the list of conversations is scrolled in accordance with a direction of the scrolling gesture. The scrolling gesture is substantially independent of a horizontal position of the user contact with the touch screen display.

Another aspect of the invention involves a portable electronic device with a touch screen display, comprising: means for displaying a set of messages exchanged between a user of the device and another person in a chronological order; means for detecting a scrolling gesture comprising a substantially vertical movement of user contact with the touch screen display, wherein the detecting of the scrolling gesture is substantially independent of a horizontal position of the user contact with the touch screen display; and means for responding to the scrolling gesture by scrolling the display of messages in accordance with a direction of the scrolling gesture.

Another aspect of the invention involves a portable electronic device with a touch screen display, comprising: means for displaying a list of conversations, each conversation including a set of messages exchanged between a user of the device and a respective other person; means for detecting a scrolling gesture comprising a substantially vertical movement of user contact with the touch screen display; and means for responding to the scrolling gesture by scrolling the list of conversations in accordance with a direction of the scrolling gesture, wherein the scrolling gesture is substantially independent of a horizontal position of the user contact with the touch screen display.

Another aspect of the invention involves a computer-implemented method in which a portable electronic device with a touch screen display displays a set of messages exchanged between a user of the device and another person in a chronological order. The messages sent by the other person include a first message sent from a first address associated with the other person and a second message sent from a second address associated with the other person that is different from the first address.

Another aspect of the invention involves a portable electronic device. The device includes a touch screen display, one or more processors, memory, and one or more programs. The one or more program are stored in the memory and configured to be executed by the one or more processors. The one or more programs include instructions for displaying a set of messages exchanged between a user of the device and another person in a chronological order. The messages sent by the other person include a first message sent from a first address associated with the other person and a second message sent from a second address associated with the other person that is different from the first address.

Another aspect of the invention involves a computer-program product that includes a computer readable storage medium and a computer program mechanism embedded therein. The computer program mechanism includes instructions, which when executed by a portable electronic device with a touch screen display, cause the device to display a set of messages exchanged between a user of the device and another person in a chronological order. The messages sent by the other person include a first message sent from a first address associated with the other person and a second message sent from a second address associated with the other person that is different from the first address.

Another aspect of the invention involves a graphical user interface (GUI) on a portable electronic device with a touch screen display. The GUI has a set of messages exchanged between a user of the device and another person in a chronological order. The messages sent by the other person include a first message sent from a first address associated with the other person and a second message sent from a second address associated with the other person that is different from the first address.

Another aspect of the invention involves a portable electronic device with a touch screen display, comprising means for displaying a set of messages exchanged between a user of the device and another person in a chronological order. The messages sent by the other person include a first message sent from a first address associated with the other person and a second message sent from a second address associated with the other person that is different from the first address.

Thus, the invention provides a transparent and intuitive user interface for creating, viewing, and finding instant message conversations on a portable electronic device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
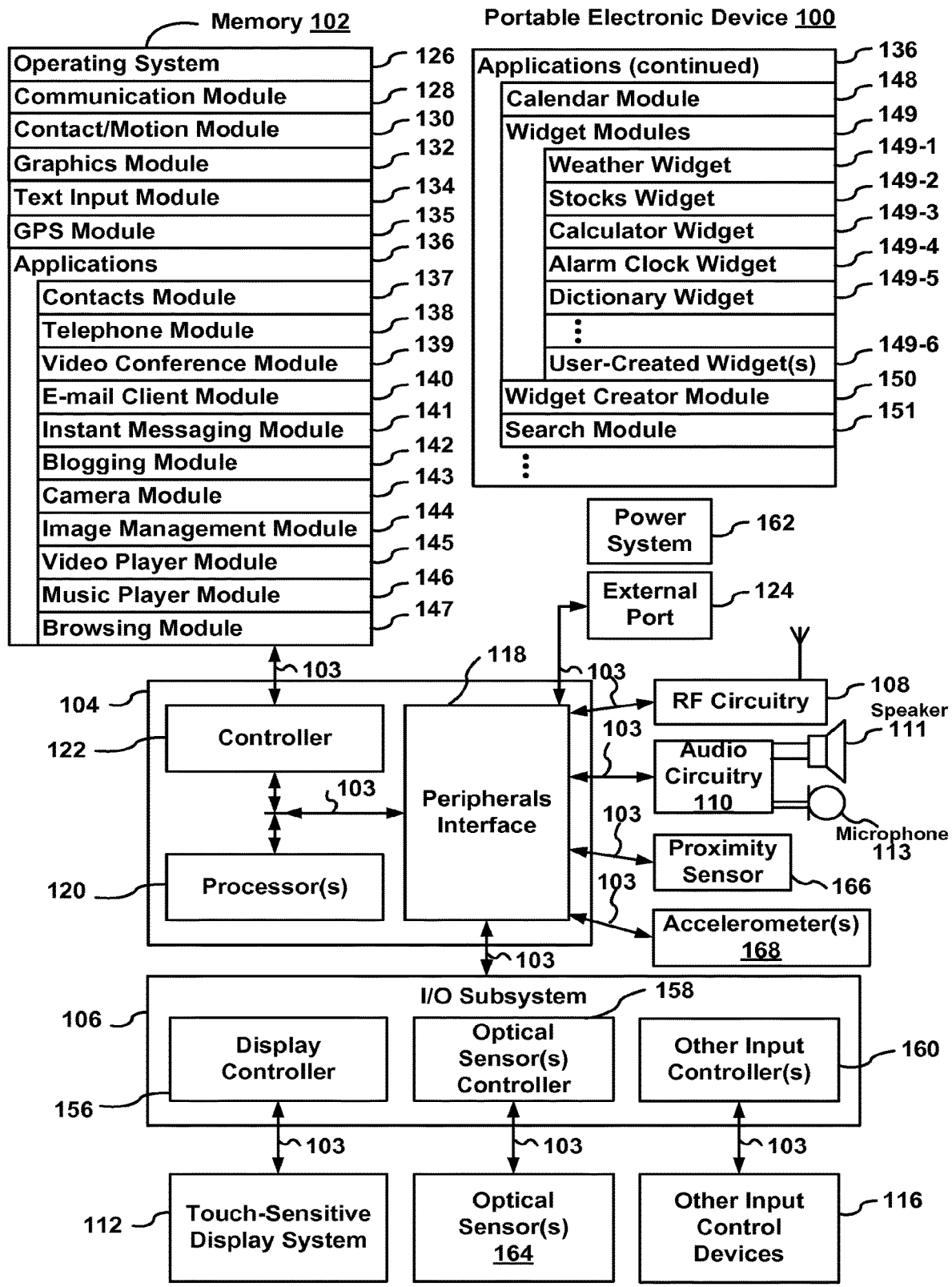
FIG. 1 is a block diagram illustrating a portable electronic device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable electronic device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable electronic device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

In addition to instant messaging, the device may support a variety of other applications, such as a telephone application, a video conferencing application, an e-mail application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable electronic device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable electronic device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable electronic device 100, and that the device 100 may have more or fewer components than shown, may combine two or more components, or a may have a different configuration or arrangement of the components. The various components shown in FIG. 1 may be implemented in hardware, software or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet Message Access Protocol (IMAP) and/or Post Office Protocol (POP)), instant messaging (e.g., eXtensible Messaging and Presence Protocol (XMPP), Session Initiation Protocol for Instant Messaging and Presence Leveraging Extensions (SIMPLE), and/or Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549 (Unlocking a Device by Performing Gestures on an Unlock Image, filed Dec. 23, 2005), which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor, or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein in their entirety.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable electronic devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device, filed Sep. 30, 2005, and Ser. No. 11/240,788, "Proximity Detector In Handheld Device," filed Sep. 30, 2005, which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIG. 1 shows an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6; and/or
- search module 151.

Examples of other applications 136 that may be stored in memory 102 include memo pad and other word processing applications, JAVA-enabled applications, encryption, digital rights management, voice recognition, and voice replication.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view an IM conversation including messages exchanged between a user of the portable device 100 and a respective other person. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., message sent using XMPP, SIMPLE, or IMPS). Embodiments of user interfaces and associated processes using instant messaging module 141 are described further below.

Note that the above identified modules and applications (including the instant messaging module 141) correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push-buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
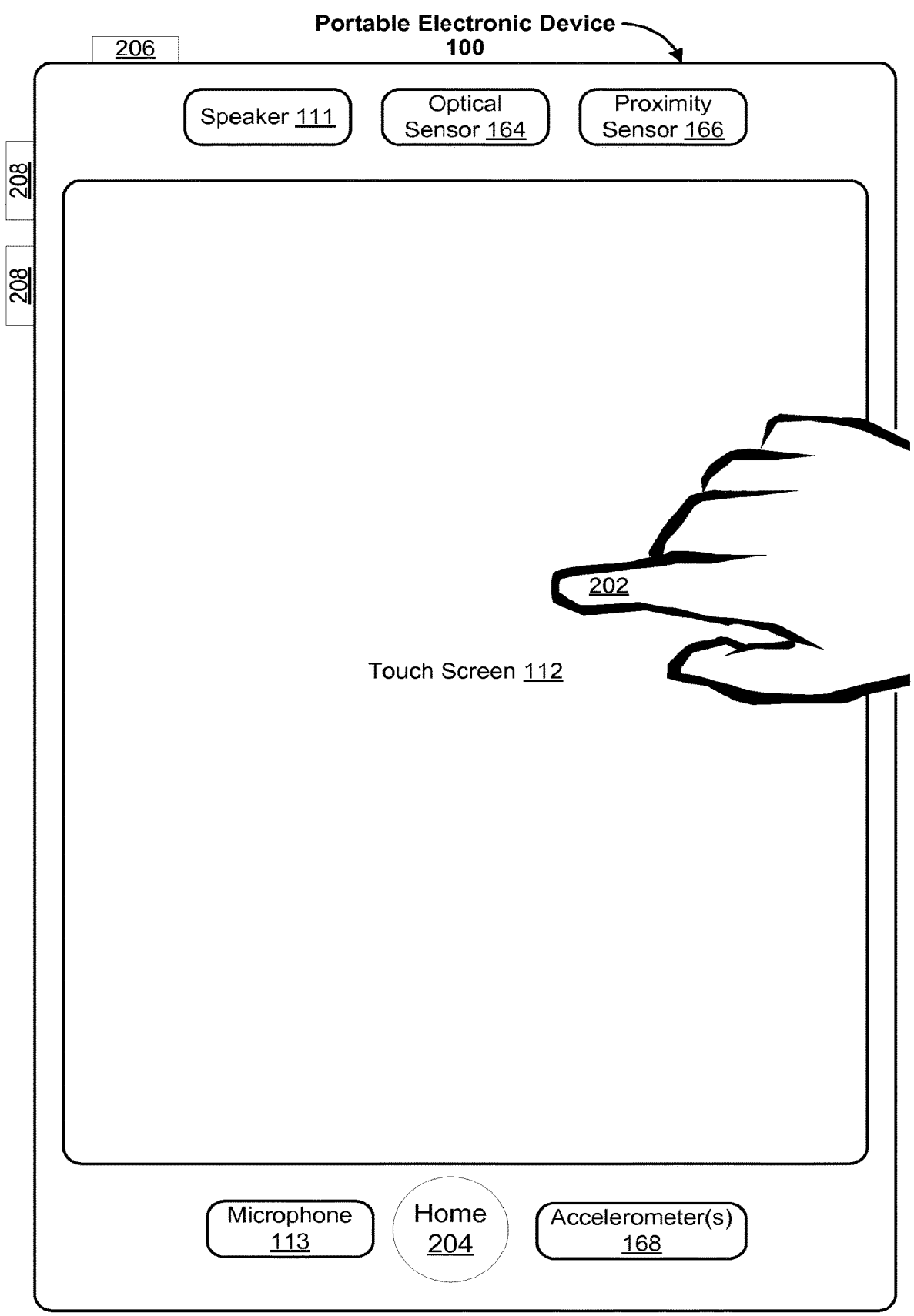
FIG. 2 illustrates a portable electronic device having a touch screen in accordance with some embodiments.

FIG. 2 illustrates a portable electronic device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure) or a stylus (not shown in the figure). In some embodiments, selection of one or more graphics occurs when the user breaks contact with the one or more graphics. In some embodiments, the contact may include a gesture, such as one or more taps, one or more swipes (from left to right, right to left, upward and/or downward and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap. In other words, the portable electronic device 100 interprets the meaning of a gesture and acts accordingly after considering which application or module is in use at the moment.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable electronic device 100.

Figure 3:
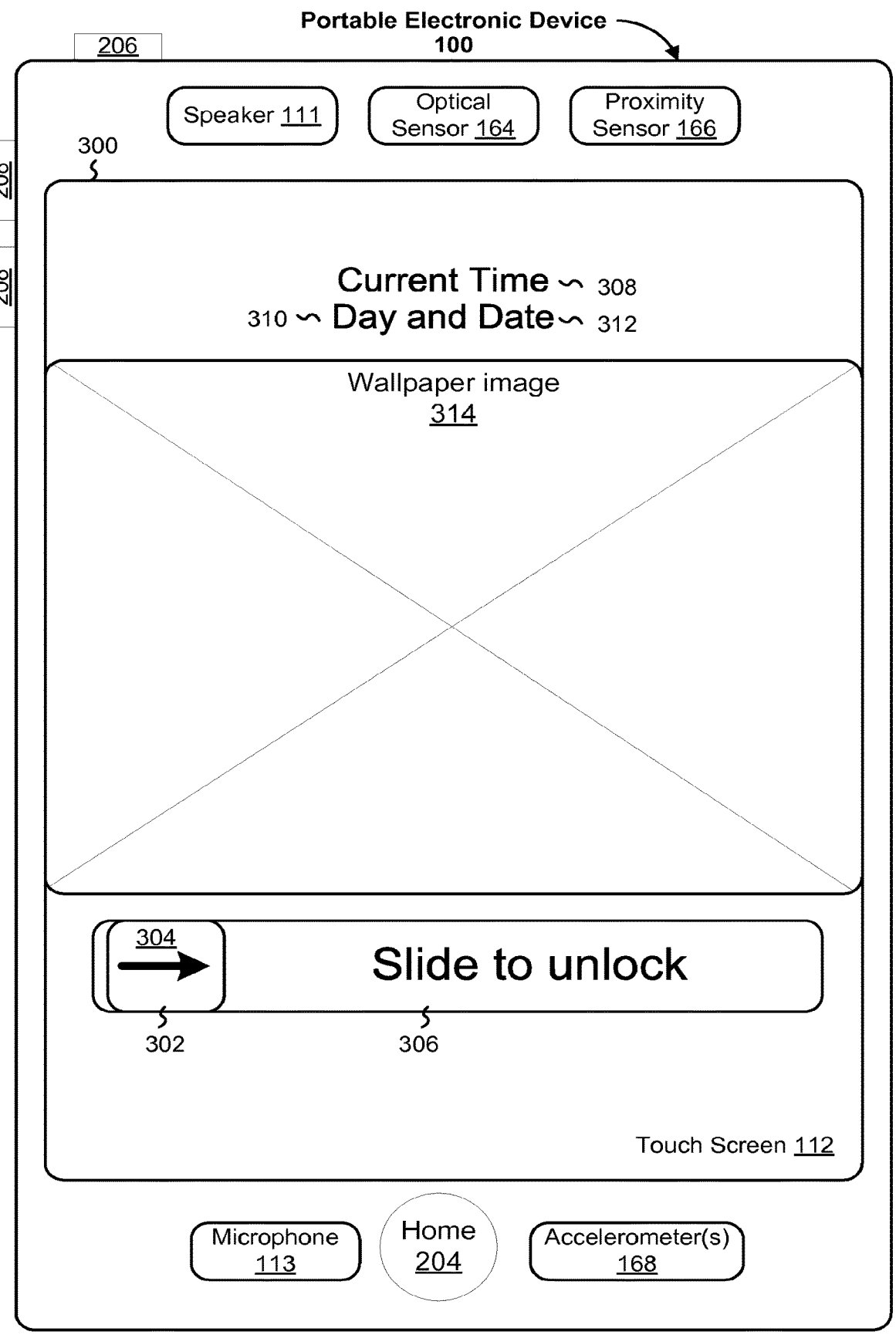
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
- Unlock image 302 that is moved with a finger gesture to unlock the device;
- Arrow 304 that provides a visual cue to the unlock gesture;
- Channel 306 that provides additional cues to the unlock gesture;
- Time 308;
- Day 310;
- Date 312; and
- Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference in its entirety.

Figure 4:
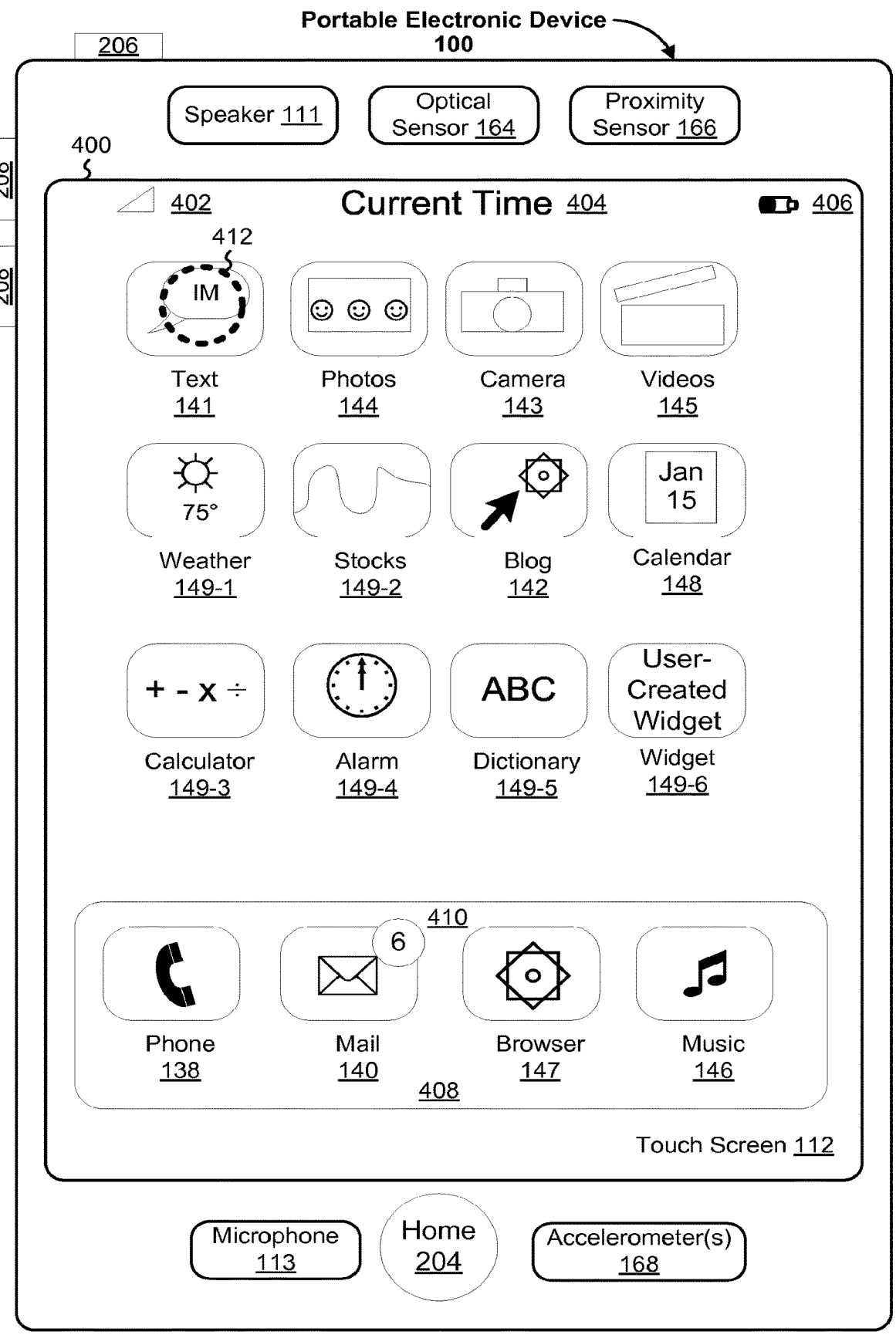
FIG. 4 illustrates an exemplary user interface for a menu of applications on a portable electronic device in accordance with some embodiments.

FIG. 4 illustrates an exemplary user interface for a menu of applications on a portable electronic device in accordance with some embodiments. In some embodiments, user interface 400 includes the following elements, or a subset or superset thereof:
- Signal strength indicator 402 for wireless communication;
- Time 404;
- Battery status indicator 406;
- Tray 408 with icons for frequently used applications, such as:
  - Phone 138;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Blog 142;
  - Calendar 148;
  - Calculator 149-3;
  - Alarm clock 149-4;
  - Dictionary 149-5; and
  - User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5:
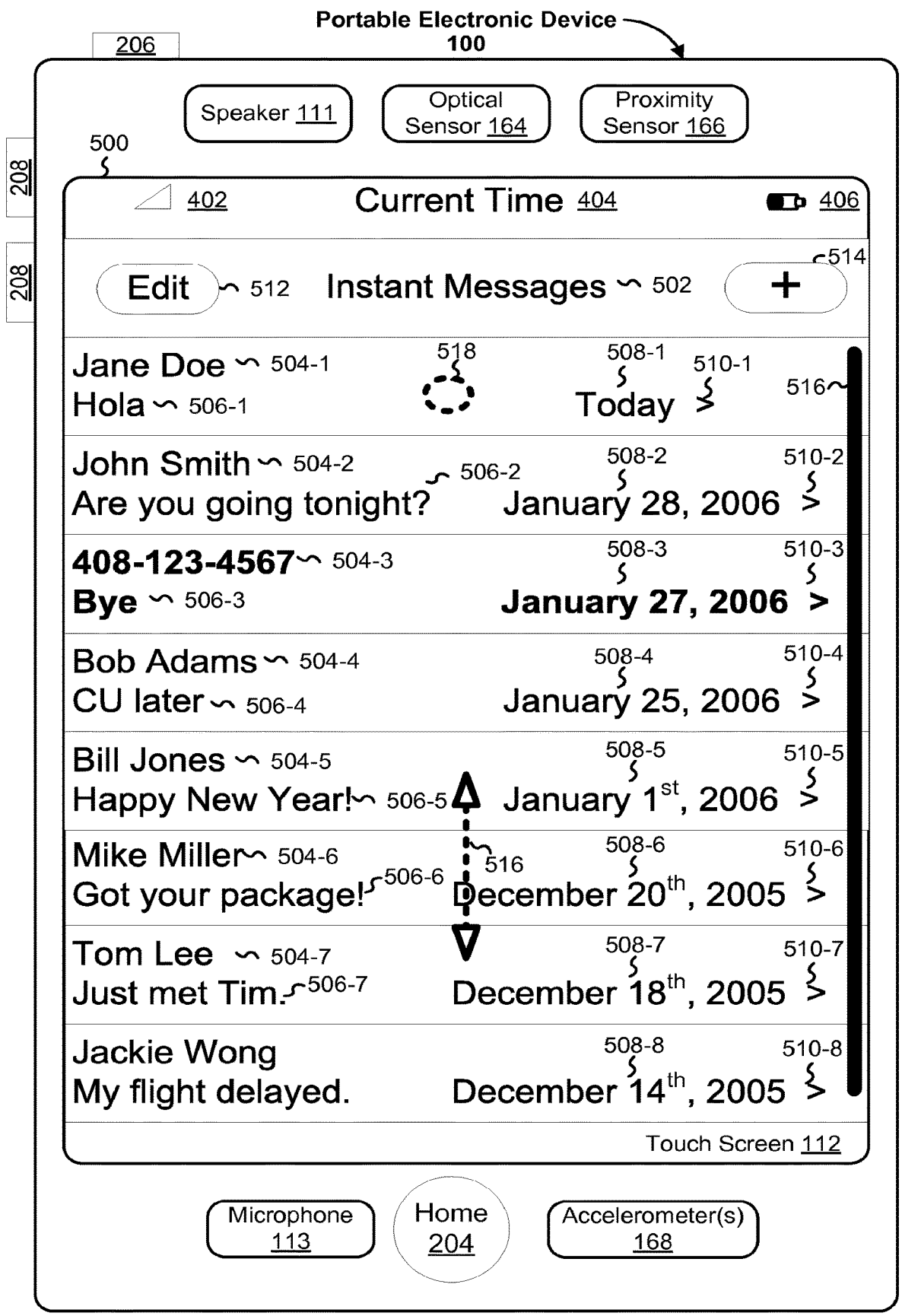
FIG. 5 illustrates an exemplary user interface for listing instant message conversations on a portable electronic device in accordance with some embodiments.

FIG. 5 illustrates an exemplary user interface for listing instant message conversations on a portable electronic device in accordance with some embodiments. An instant message conversation includes a set of messages exchanged between a user of the portable electronic device and one or more other persons. In some embodiments, user interface 500 includes the following elements, or a subset or superset thereof:
- 402, 404, and 406, as described above;
- "Instant Messages" or other similar label 502:
- Names 504 of the persons a user has instant message conversations with (e.g., Jane Doe 504-1) or the phone number if the corresponding person's name is not available (e.g., 408-123-4567 504-3);
- Text 506 of the last message or a portion thereof in the conversation (note that the last message could be the last one either sent or received by the user);
- Date 508 and/or time of the last message in the conversation;
- Selection icon 510 that when activated (e.g., by a finger gesture on the icon) initiates transition to a UI for the corresponding conversation (e.g., FIG. 6A for Jane Doe 504-1);
- Edit icon 512 that when activated (e.g., by a finger gesture on the icon) initiates transition to a UI for deleting conversations (e.g., FIG. 7);
- Create message icon 514 that when activated (e.g., by a finger gesture on the icon) initiates transition to the users contact list (e.g., FIG. 8A); and Vertical bar 516 that helps a user understand what portion of the list of instant message conversations is being displayed.

Figure 10:
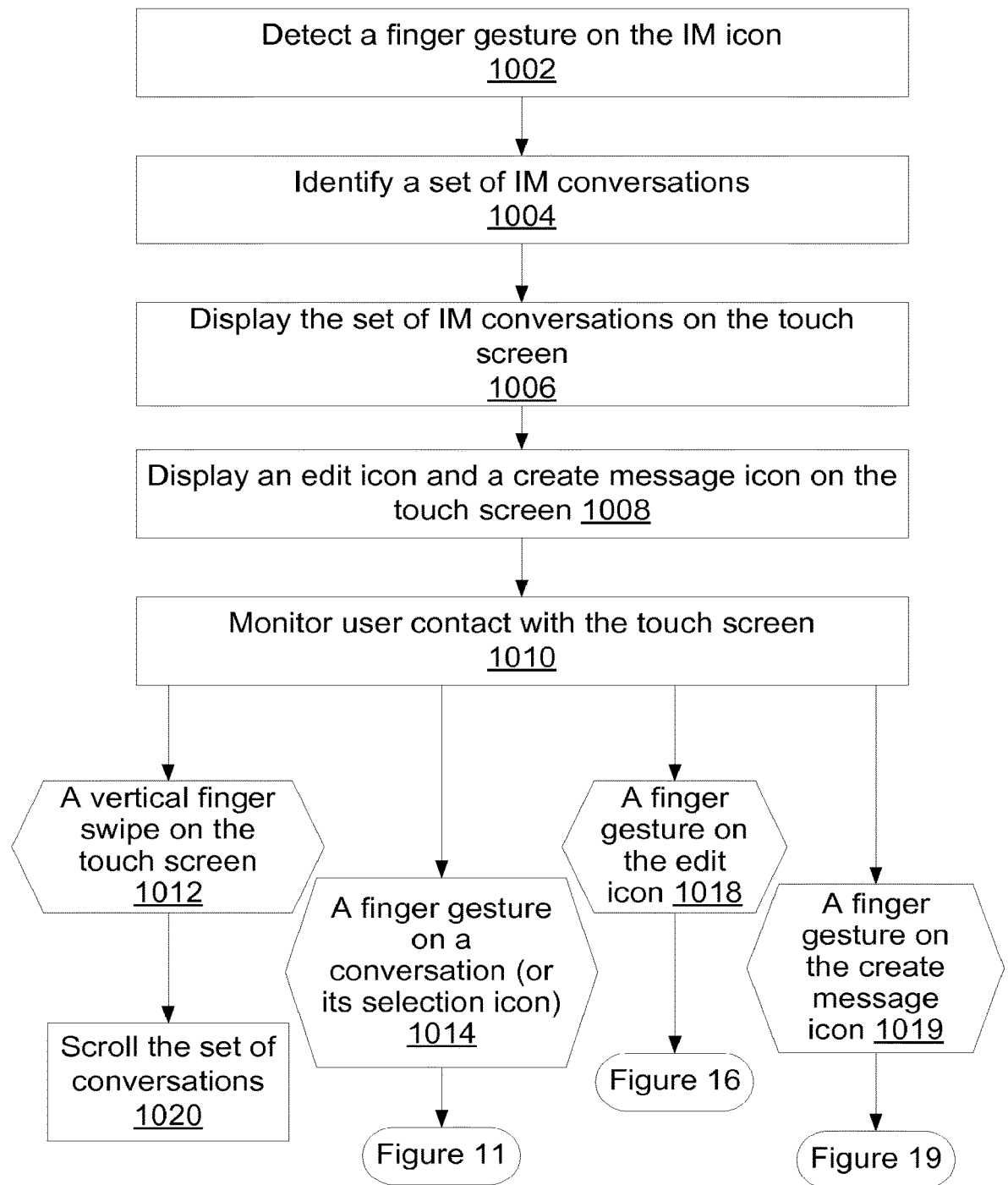
FIG. 10 is a flowchart illustrating a process for displaying a list of instant message conversations on a portable electronic device's touch screen in accordance with some embodiments.

FIG. 10 is a flowchart illustrating a process for displaying a list of instant message conversations on a portable electronic device's touch screen in accordance with some embodiments. Upon detecting a finger gesture (1002) (e.g., a finger tap 412 on the IM icon 141, FIG. 4), the IM module 141 identifies a set of IM conversations (1004) and displays them on the touch screen (1006). To be able to edit an existing conversation or launch a new conversation, the portable device may display an edit icon 512 and a create message icon 514, respectively, on the touch screen (1008). The portable device monitors user contact with the touch screen and acts accordingly (1010).

As shown in FIG. 5, the list of conversations may be displayed in a chronological order. The conversation with "Jane Doe" is at the top because it is the only conversation that includes at least one message generated today 508-1, which is assumed to be Jan. 29, 2006 in this example. In some embodiments, the conversations are ordered by the timestamp of the most recent message in each conversation. In some embodiments, a conversation including at least one message that has not been checked by the user is highlighted in the touch screen. For example, the third conversation in the list is displayed using boldfaced characters to suggest that the user has not checked the recent message sent by the person at the phone number 408-123-4567.

In some embodiments, the name 504 associated with an instant message conversation is determined by finding an entry in the user's contact list 137 that contains the phone number used by the instant message conversation. If no such entry is found, then just the phone number is displayed (e.g., 504-3). In some embodiments, if the other person sends messages from two or more different phone numbers, the messages may appear in the same conversation including the person's name if all the phone numbers used are found in the same entry (i.e., the entry for the other person) in the user's contact list 137. In some embodiments, the conversation includes messages sent from phone numbers and/or email addresses associated with the other person. In some embodiments, the messages sent by the other person include a first message sent from a first address associated with the other person and a second message sent from a second address associated with the other person that is different from the first address. In some embodiments, the first address is a telephone number and the second address is an email address. In some embodiments, the first and second addresses are two distinct telephone numbers. In some embodiments, the first and second addresses are two distinct email addresses.

In some other embodiments, if the other person sends messages from two or more different phone numbers, the messages may appear in different conversations corresponding to different numbers. The phone numbers or other identifiers are displayed next to the person's name to distinguish these conversations from each other.

In some embodiments, the name field of an instant message conversation includes names or other identifiers of multiple parties that participate in the conversation as message recipients and/or senders. If there is no room for displaying all the names, a selected subset of names is displayed with a symbol like " . . . " at the end, indicating that there are more parties in the conversation. By default, a message by the user of the portable electronic device is sent to all the parties of the conversation. For simplicity, the subsequent embodiments of IM conversations described here involve only two parties, the user and another person. But one skilled in the art will appreciate that the methodologies described in the present invention are also applicable to an IM conversation involving more than two parties.

Automatically binning the instant messages into "conversations" (instant messages exchanged between the user of the device and a respective person or phone number) makes it easier for the user to carry on and keep track of instant message exchanges with multiple parties. As will be described below, the user is not only able to see the last message sent by the other party, the user can also visit old messages exchanged between the user and the other party.

In some embodiments, vertical bar 516 is displayed temporarily after an object is detected on or near the touch screen display (e.g., a finger touch is detected anywhere on the list of instant message conversations). In some embodiments, the vertical bar 516 has a vertical position on top of the displayed portion of the list that corresponds to the vertical position in the list of the displayed portion of the list. In some embodiments, the vertical bar 516 has a vertical length that corresponds to the portion of the list being displayed. In some embodiments, if the entire list of IM conversations can be displayed simultaneously on the touch screen 112, the vertical bar 516 is not displayed. In some embodiments, if the entire list of IM conversations can be displayed simultaneously on the touch screen 112, the vertical bar 516 is displayed with a length that corresponds to the length of the list display area (e.g., as shown in FIG. 5).

As noted above, the portable device monitors (1010) user contact with the conversation list. When the user swipes his finger or a stylus on the touch screen in a substantially vertical direction (1012), this user contact may be interpreted as a scrolling gesture. In some embodiments, the scrolling gesture is independent of the horizontal position of the user contact with the touch screen display. In some embodiments, the scrolling gesture is substantially independent of the horizontal position of the user contact with the touch screen display (e.g., one or more side regions of the touch screen display may be reserved for other functions, such as functions corresponding to icons, soft keys or application navigation functions, and not available for the scroll gesture). The portable electronic device, accordingly, scrolls the conversation list and displays a different portion of the conversation list (1020).

As shown in FIG. 5, the conversation list moves in a direction consistent with the scrolling gesture 516. If the scrolling gesture is downward (or upward), the conversation list also moves downward (or upward). Scrolling the conversation list downward will typically scroll the list to earlier entries in the list, until the first entry is reached (e.g., Jane Doe 504-1). But if the user does not have too many IM conversations, the portable electronic device may display the entire conversation list and the scrolling gesture has no effect.

If the user taps on the edit icon 512 using his finger or stylus (1018), the portable electronic device replaces the conversation list UI with a new UI that allows the user to edit the conversations. A more detailed description of the conversation editing feature is provided below in connection with FIGS. 7 and 16.

Similarly, if the user taps on the message creation icon 514 (1019), the portable electronic device replaces the conversation list UI with a new UI that allows the user to create a new instant message and therefore a new conversation. A more detailed description of this feature is provided below in connection with FIGS. 8A-8B, 9 and 19.

If the user taps on a particular conversation in the list (1014), the portable electronic device would interpret the tap as a gesture indicating that the user intends to check the messages associated with the user selected conversation. Accordingly, the portable electronic device replaces the conversation list UI shown in FIG. 5 with a conversation UI shown in FIG. 6A.

FIGS. 6A through 6K illustrate an exemplary user interface for inputting text for an instant message in accordance with some embodiments.

In some embodiments, user interface 600A (FIG. 6A) includes the following elements, or a subset or superset thereof:

- 402, 404, and 406, as described above;
- Name 504 corresponding to the phone number used in the instant message conversation (or the phone number itself if the name is not available);
- Instant messages icon 602 that when activated (e.g., by a finger gesture on the icon) initiates transition to a UI listing instant message conversations (e.g., UI 500);
- Instant messages 604 from the other party, typically listed in order along one side of UI 600A;
- Instant messages 606 to the other party, typically listed in order along the opposite side of UI 600A to show the back and forth interplay of messages in the conversation;
- Timestamps 608 for at least some of the instant messages;
- Text entry box 612;
- Send icon 614 that when activated (e.g., by a finger gesture on the icon) initiates sending of the message in text box 612 to the other party (e.g., Jane Doe 504-1);
- Letter keyboard 616 for entering text in box 612;
- Alternate keyboard selector icon 618 that when activated (e.g., by a finger gesture on the icon) initiates the display of a different keyboard (e.g., 624, FIG. 6C);
- Send icon 620 that when activated (e.g., by a finger gesture on the icon) initiates sending of the message in text box 612 to the other party (e.g., Jane Doe 504-1);
- Shift key 628 that when activated (e.g., by a finger gesture on the icon) capitalizes the next letter chosen on letter keyboard 616; and
- Vertical bar 630 that helps a user understand what portion of the list of instant messages in an IM conversation is being displayed.

Figure 11:
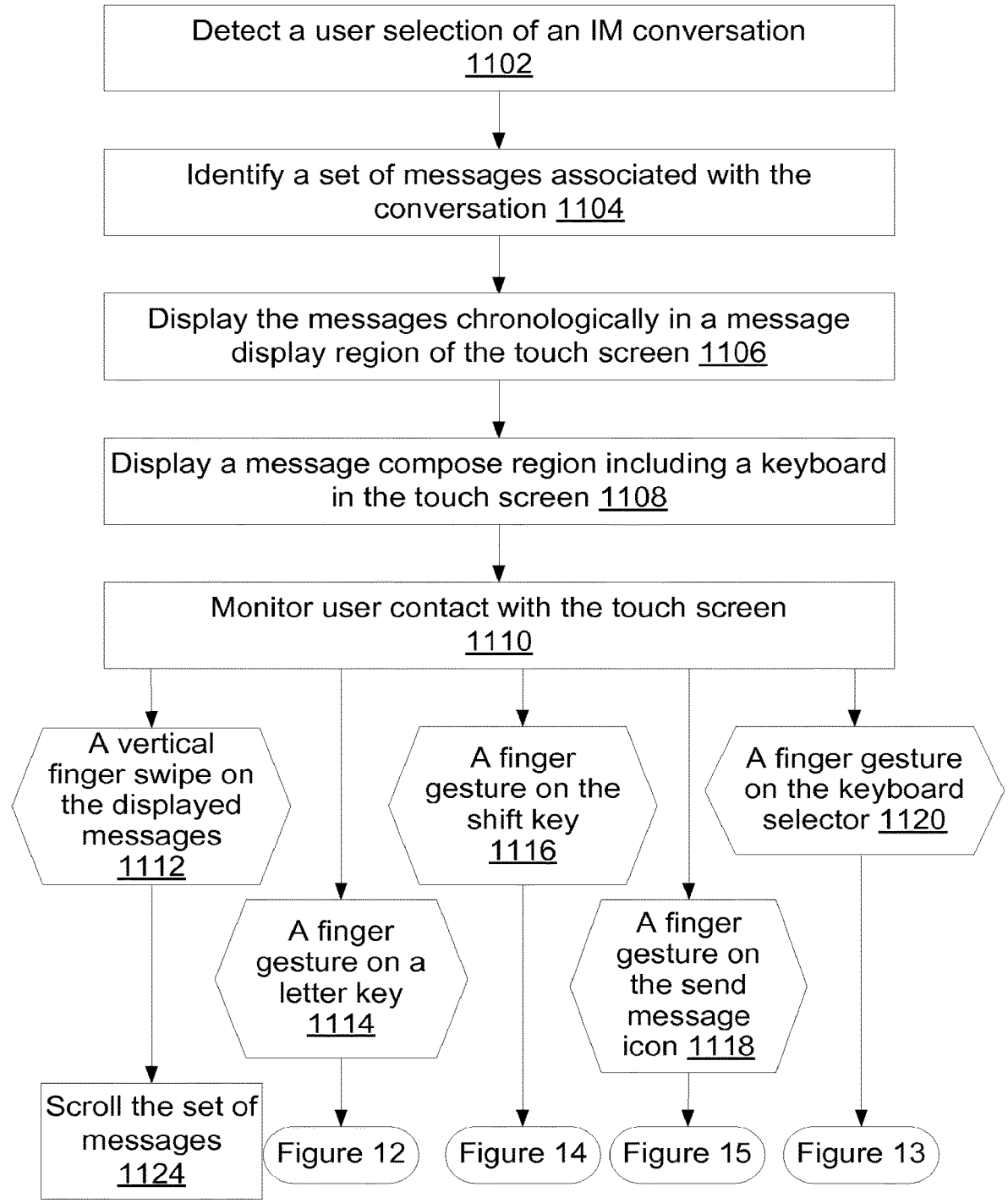
FIG. 11 is a flowchart illustrating a process for displaying a user selected instant message conversation upon detecting a predefined user contact with the portable electronic device's touch screen in accordance with some embodiments.

FIG. 11 is a flowchart illustrating a process for displaying a user selected instant message conversation upon detecting a predefined user contact with the portable electronic device's touch screen in accordance with some embodiments. In this example, the conversation with Jane Doe is displayed in response to a finger gesture 518 on the conversation with Jane Doe (FIG. 5).

Upon detecting the user selection of the conversation with Jane Doe (1102), IM module 141 identifies a set of instant messages 604 & 606 associated with the conversation (1104) and displays the instant messages in a message display region of the touch screen in a chronological order (1106). Because a user visiting an existing conversation may want to compose a new instant message to the other person, the portable electronic device also displays a message compose region on the touch screen (1108). In some embodiments, the message compose region includes a text box 612 displaying characters entered by the user, a send message icon 614, a letter keyboard 616, and a keyboard selector icon 618. The portable electronic device monitors the user contact with the touch screen and responds accordingly (1110).

Figure 21:
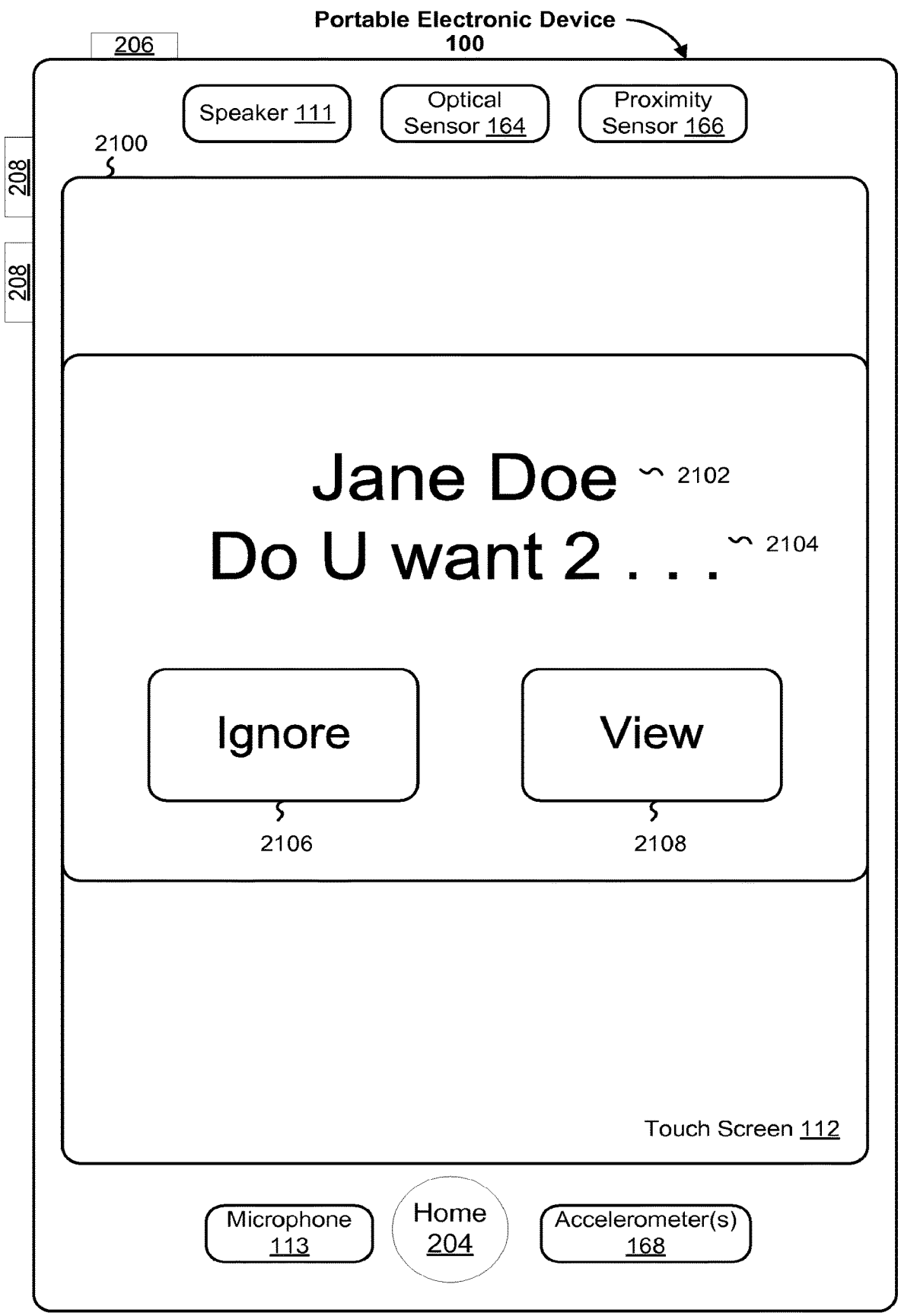
FIG. 21 illustrates an exemplary user interface for alerting a user to a new instant message in accordance with some embodiments.

In some embodiments, the portable electronic device receives an instant message while the user of the device is using another application, e.g., browsing a web page using the browser 147 or listening to music using the music player 146. In this case, the device may replace the user interface of an on-going application with a new user interface on the touch screen 112 or superimpose a new user interface on top of the user interface for the on-going application. FIG. 21 illustrates an exemplary user interface for alerting a user to a new instant message in accordance with some embodiments. This user interface may or may not suspend or terminate the on-going application. For example, the user may still listen to the music when this new user interface appears on the touch screen 112. This may be true even if the user subsequently chooses to activate the IM module 141 and respond to the new message.

In some embodiments, the new user interface (e.g., UI2100, FIG. 21) includes the following elements, or a subset or superset thereof:

- the name 2102 of the person sending the instant message (e.g., Jane Doe), which may be determined by matching the phone number for the incoming instant message with a phone number in the user's contacts 137;
- the newly received instant message or a portion thereof 2104 (e.g., "Do U want 2 . . . ");
- a first action icon 2106, e.g., "Ignore"; and
- a second action icon 2108, e.g., "View."

A user selection of the "Ignore" icon 2106 brings back the user interface of the on-going application and the user can resume the operation that was interrupted by the incoming message. A user selection of the "View" icon 2108 may bypass the user interface 500 and bring the user directly to the user interface 600A that includes the new instant message. The user can then perform any message-related operations, as described below.

In some embodiments, the portable electronic device may receive an instant message while it is in the lock mode. In this case, the device may include a visual alert indicating the arrival of the new message in the user interface 300 and/or generate an audio alert through the device's speaker 111. If the user of the device unlocks the device's touch screen 112 in response to the visual and/or audio alert, the user may see user interface 600A (not user interface 400) on the touch screen.

Figure 6A:
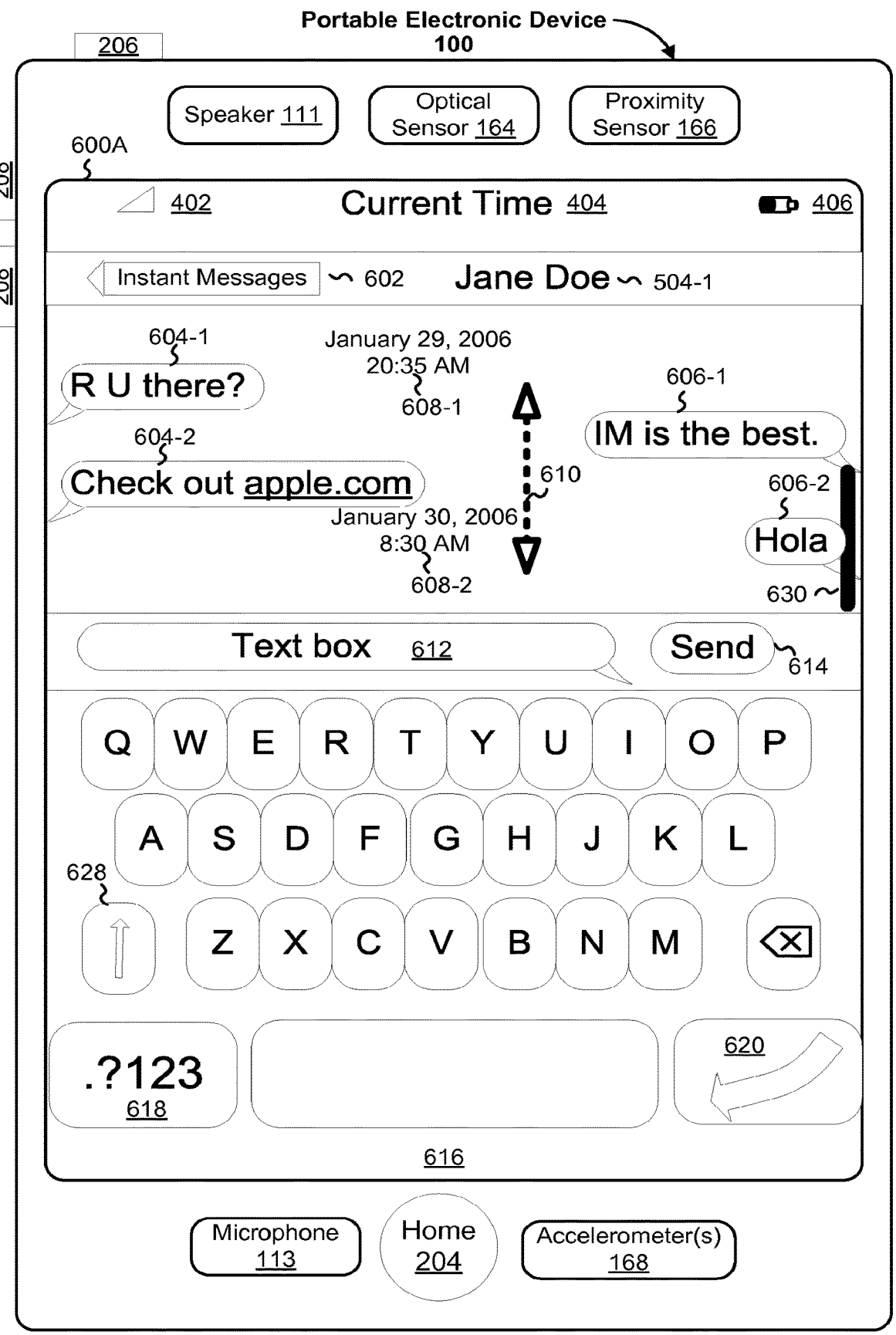
FIGS. 6A through 6K illustrate an exemplary user interface for inputting text for an instant message in accordance with some embodiments.

As shown in FIG. 6A, the instant messages 604 from Jane Doe may be displayed on the left side of the message display region with the most recent message (e.g., 604-2) towards the bottom. The messages sent by the user to Jane Doe are on the opposite side of the display region. The messages' relative vertical locations correspond to the order in which these messages are exchanged between the user of the device and Jane Doe. Selected timestamps 608 further indicate when these messages are exchanged. In some embodiments, a timestamp is displayed near the message it is associated with. If the message display region does not have enough room to display the timestamp of every message currently in the message display region, the device may choose to display timestamps for a subset of the messages, e.g., a timestamp 608-1 corresponding to the message 604-1 at the top of the message region and a timestamp 608-2 corresponding to the message 606-2 at the bottom of the message region. In some embodiments, the device may display more timestamps for messages in the middle if, e.g., the time gap between the two messages is above a predefined threshold. From the instant messages, the user can easily capture the topic of the conversation. If necessary, the user can browse the other old messages not currently on display by applying a scrolling gesture 610 on the message display region (1112). In response, the portable electronic device scrolls the set of message conversations (1124). In some embodiments, the scrolling gesture is independent of the horizontal position of the user contact with the touch screen display. In some embodiments, the scrolling gesture is substantially independent of the horizontal position of the user contact with the touch screen display, as described above.

In some embodiments, the device highlights certain portions of incoming and outgoing messages using, e.g., underlines, distinct font sizes or styles, and/or colors. Typically, the highlighted portions are deemed to have special connotations such as phone numbers, URLs, stock tickers, or contacts' names. These highlighted message portions may be user-selectable. For example, a user finger gesture on the highlighted portion "apple.com" of the message 604-2 causes the activation of the browser 147, which then brings up the home page of the website www.apple.com. Similarly, a user finger gesture on a telephone number activates the phone 138 and initiates a call to the telephone number.

In some embodiments, a vertically downward scrolling gesture scrolls the conversation downward, thereby showing older messages in the conversation. In some embodiments, a vertically upward scrolling gesture scrolls the conversation upward, thereby showing newer, more recent messages in the conversation. In some embodiments, as noted above, the last message in the conversation (e.g., 606-2) is displayed in the list of instant message conversations 500 (e.g., 506-1).

In some embodiments, vertical bar 630 is displayed temporarily after an object is detected on or near the touch screen display (e.g., a finger touch is detected anywhere on the list of instant messages). In some embodiments, the vertical bar 630 has a vertical position on top of the displayed portion of the list that corresponds to the vertical position in the list of the displayed portion of the list. In some embodiments, the vertical bar 630 has a vertical length that corresponds to the portion of the list being displayed. For example, in FIG. 6A, the vertical position of the vertical bar 630 indicates that the bottom of the list of messages is being displayed (which correspond to the most recent messages) and the vertical length of the vertical bar 630 indicates that roughly half of the messages in the conversation are being displayed.

In response to the user's finger gestures on different letter keys in the keyboard (1114), a new instant message is composed in the text box 612. A more detailed description of this composition process is provided below in connection with FIG. 12. In some embodiments, the keyboard 616 in FIG. 6A has only 26 English characters due to the touch screen's limited size. To enter characters such as digits, punctuation and other special symbols, the user needs to tap on the keyboard selector icon 618 (1120) and/or the shift key icon 628 (1116) to bring in additional keyboards or switch the existing keyboard to a different display mode (e.g., from upper/lower case to lower/upper case). More detailed descriptions of these processes are provided below in connection with FIGS. 13 and 14, respectively. After completing the new message, the user taps on the send message icon 614 or 620 to transmit the message to the other participant of the conversation (1118). A more detailed description of the sending process is provided below in connection with FIG. 15.

Figure 12:
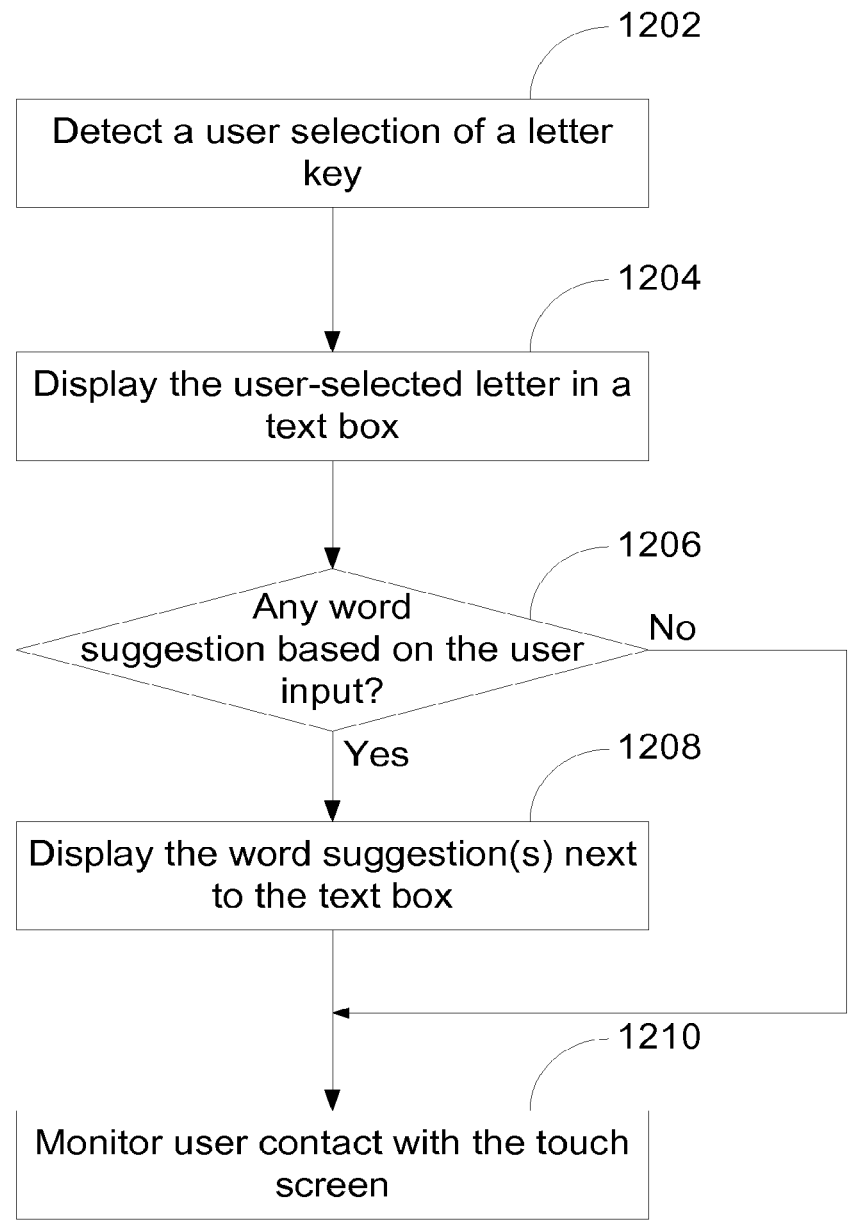
FIG. 12 is a flowchart illustrating a process for displaying a user-entered character and word suggestions, if any, in accordance with some embodiments.

FIG. 12 is a flowchart illustrating a process for displaying a user-entered character and word suggestions, if any, in accordance with some embodiments. Upon detecting a user selection of a letter key (1202), the portable electronic device displays the user-selected letter in the text box 612 (1204). To expedite the process of composing the new message, the portable electronic device may determine if it can offer any word suggestions based on the user input (1206). To do so, the portable electronic device may apply linguistics-based algorithms (e.g., as described in U.S. patent application Ser. No. 11/549,624, titled "Method, System, and Graphical User Interface for Text Entry with Partial Word Display" filed Oct. 13, 2006, which is hereby incorporated by reference in its entirety) to the user input and display one or more related words from its database (1208).

Figure 6B:
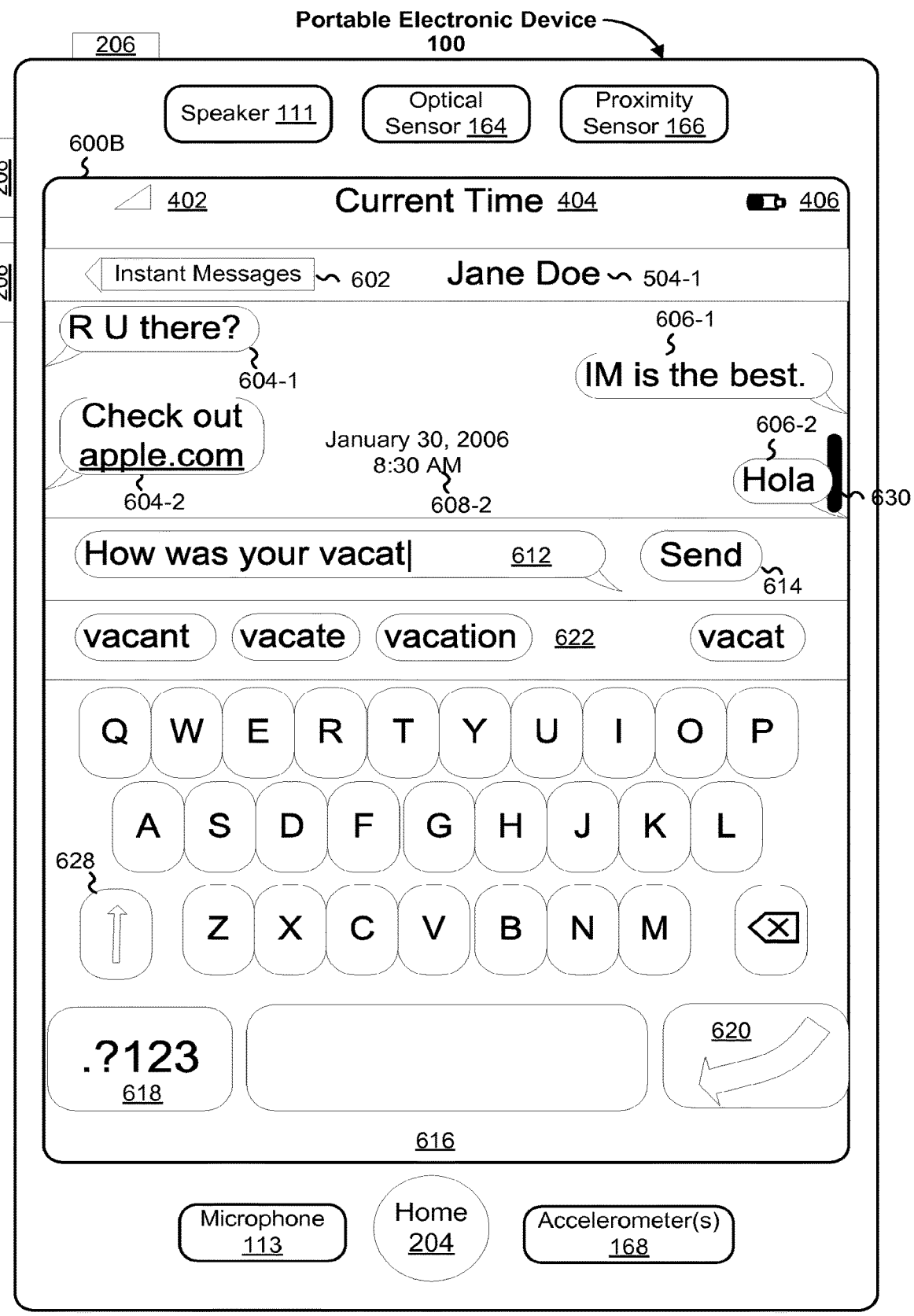

As shown in FIG. 6B, user interface 6008 (FIG. 6B) includes the following elements, or a subset or superset thereof:

402, 404, 406, 602, 604, 606, 608, 612, 614, 616, 618, and 620 as described above; and word suggestion area 622 that provides a list of possible words to complete the word fragment being typed by the user in text box 612.

In this example, based on the user-entered string "vacat", the portable electronic device displays three possible words, "vacant", "vacate", and "vacation", in the area 622. The user can choose any of them by finger tapping on a respective word icon. Alternatively, the user can ignore all the computer-suggested words by tapping on the one exactly matching his input. In some embodiments, the portable electronic device also saves the user input as a new word in its database. Subsequently, when the user enters the same string or a subset thereof, the portable electronic device may display this new word as one of the word suggestions. In some embodiments, the word suggestion area does not appear in UI 6008 until after a predefined time delay (e.g., 2-3 seconds) in text being entered by the user. In some embodiments, the word suggestion area is not used or can be turned off by the user.

If there is no suggestion by the portable electronic device or if the option is turned off, the portable electronic device resumes monitoring the user contact with the touch screen and acts accordingly (1210).

Additional description of providing word suggestions can be found in U.S. patent application Ser. No. 11/620,642, "Method, System, and Graphical User Interface for Providing Word Recommendations," filed Jan. 5, 2007, the content of which is hereby incorporated by reference in its entirety.

As noted above, the keyboard 616 may not include all the characters the user would like to enter. There are different approaches to bringing in additional characters. For example, as shown in FIG. 6B, the user can tap on the keyboard selector icon 618 to replace the current letter keyboard 616 with a new keyboard that includes a different set of characters such as digits and/or punctuation.

Figure 13:
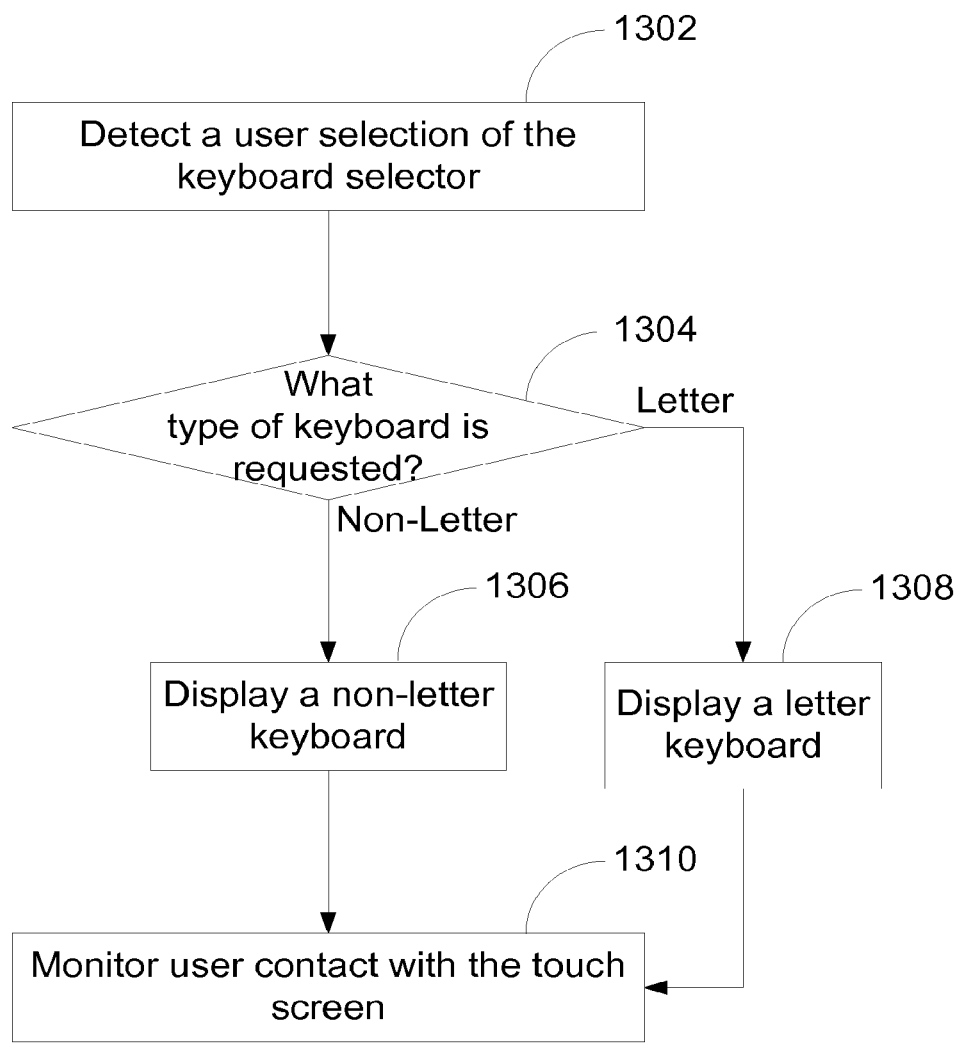
FIG. 13 is a flowchart illustrating a process for displaying respective keyboards upon detecting a user contact with a keyboard selection icon in accordance with some embodiments.

FIG. 13 is a flowchart illustrating a process for displaying respective keyboards upon detecting a user contact with a keyboard selection icon in accordance with some embodiments. In response to a user selection of the keyboard selector 618 (1302), the portable electronic device checks what type of keyboard is requested (1304). Depending on the type of the requested keyboard, the portable electronic device displays a letter keyboard (1308) or non-letter keyboard (1306). In some embodiments, the meaning of the user contact with the keyboard selector icon 618 depends on the keyboard's current display mode. Following the display of the requested keyboard, the portable electronic device then resumes monitoring the user contact with the touch screen (1310).

Figure 6C:
Figure 6D:

As shown in FIG. 6C, after a user finger gesture on the keyboard selector icon 618 in FIG. 6B, a new user interface 600C is rendered on the touch screen with the following elements, or a subset or superset thereof:

402, 404, 406, 602, 604, 606, 608, 612, 614, 620, and 622 as described above;

Alternate keyboard 624, which may be made up primarily of digits and punctuation, with frequently used punctuation keys (e.g., period key 631, comma key 633, question mark key 635, and exclamation point key 637) made larger than the other keys;

Letter keyboard selector icon 626 that when activated (e.g., by a finger gesture on the icon) initiates the display of a letter keyboard (e.g., 616, FIG. 6A); and Shift key 628 that when activated (e.g., by a finger gesture on the icon) initiates display of yet another keyboard (e.g., 639, FIG. 6D).

Note that the non-letter keyboard selector 618 in FIG. 6B is now replaced with the letter keyboard selector 626 in FIG. 6C. In some embodiments, the period key 631 and the comma key 633 are located near the keyboard selector icon 626 to reduce the distance that a user's finger needs to travel to enter the oft-used period and comma.

But the alternate keyboard 624 may not be all-inclusive. For example, it may not have any arithmetic operators such as "+", "−", "*", or "/". A finger gesture on the keyboard selector 626 brings back the letter keyboard 616, not any new keyboards. In some embodiments, the user may tap on another multi-function key, e.g., the shift key 628, to bring in additional keyboards.

Figure 14:
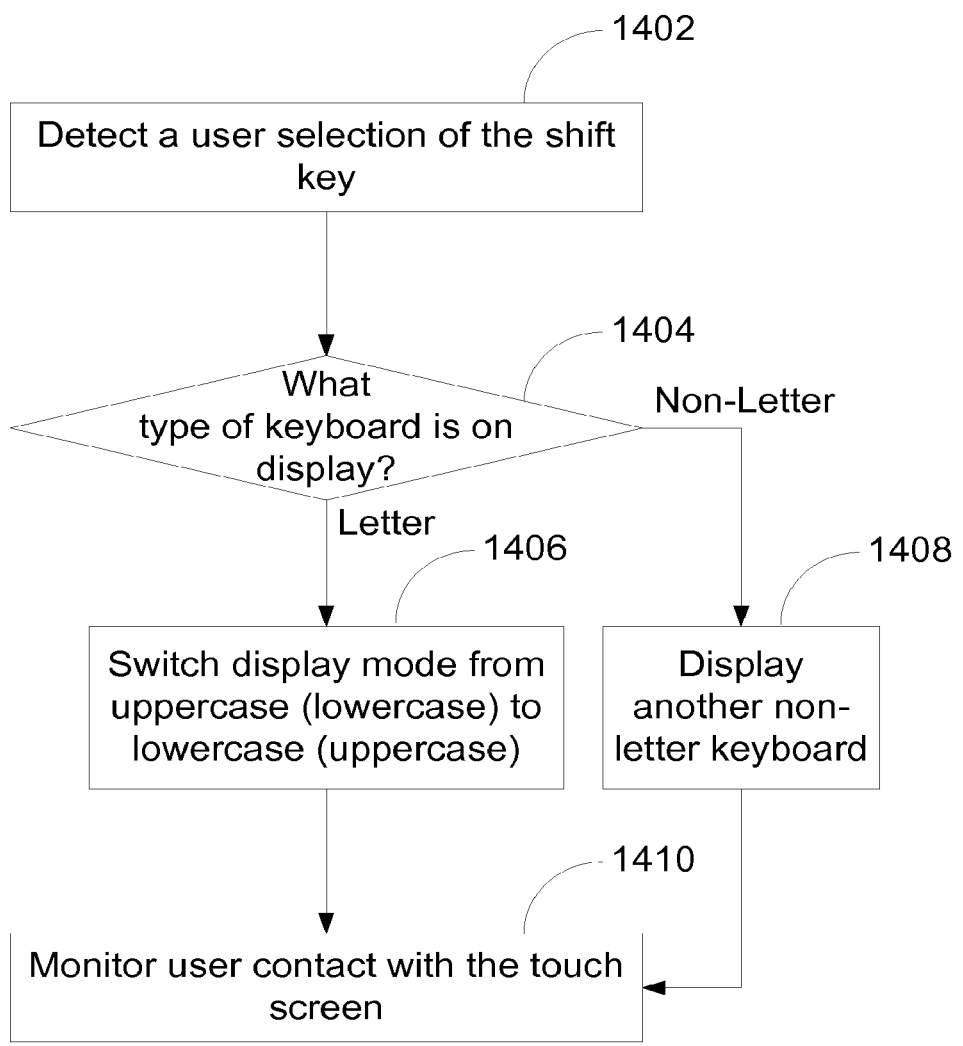
FIG. 14 is a flowchart illustrating a process for interpreting the meaning of a particular user contact with the shift key in accordance with some embodiments.

In some embodiments, like the keyboard selector icons (618, 626), the shift key 628 has different meanings in different contexts. FIG. 14 is a flowchart illustrating a process for interpreting the meaning of a particular user contact with the shift key 628 in accordance with some embodiments. The portable electronic device detects user selection of the shift key (1402). The portable electronic device checks what keyboard is currently displayed on the touch screen (1404). If the current one is a letter keyboard, a finger gesture on the shift key triggers the portable electronic device to switch its display mode of the subsequent user-entered letters from uppercase to lowercase or vice versa (1406).

Referring back to FIG. 6B, in some embodiments, the portable electronic device, by default, only displays the first letter "h" of the first word "how" in uppercase. If the user wants to enter another uppercase letter in the same sentence, he can tap on the shift key 628. As a result, the shift key 628 is displayed in a visually different manner (e.g., with a different color or shading) after the finger gesture. In some embodiments, the shift key 628 returns to the lowercase mode after the user enters the next letter in uppercase. If the user wants to enter a sequence of uppercase letters, he can maintain the finger contact with the shift key 628 for a predefined extended period of time (e.g., 1-3 seconds) until the shift key 628 has a new appearance. In some other embodiments, the shift key 628 stays in the uppercase mode for all subsequent user-entered letters until another finger gesture is detected on the shift key 628.

Returning now to FIG. 14, the user contact with the shift key 628 has a different meaning if the current keyboard is a non-letter keyboard (e.g., the alternate keyboard 624 in FIG. 6C). Because none of the characters in the keyboard 624 have two different display modes, the portable electronic device replaces the keyboard 624 with another non-letter keyboard 639 (1408) and then waits for the next user contact with the touch screen (1410).

FIG. 6D is a screenshot of the corresponding user interface 600D, which includes the following elements, or a subset or superset thereof:

402, 404, 406, 602, 604, 606, 608, 612, 614, 620, 622, 626, 628 as described above; and Another alternate keyboard 639, which may be made up primarily of symbols and punctuation, with frequently used punctuation keys (e.g., period key 631, comma key 633, question mark key 635, and exclamation point key 637) made larger than the other keys.

Like the keyboard 624, none of the characters in the keyboard 639 have two different display modes. In some embodiments, the user can tap again on the shift key 628 to bring in more alternate keyboards with more special characters or symbols. In some embodiments, the user can tap again on the shift key 628 to return to the alternate keyboard 624. At any time, the user can also switch back to the letter keyboard by tapping on the keyboard selection icon 626.

Additional description of selecting soft keyboards can be found in U.S. patent application Ser. No. 11/553,431, "Method, System, and Graphical User Interface for Selecting a Soft Keyboard," filed Oct. 26, 2006, the content of which is hereby incorporated by reference in its entirety.

Figure 6E:
Figure 6F:
Figure 6G:
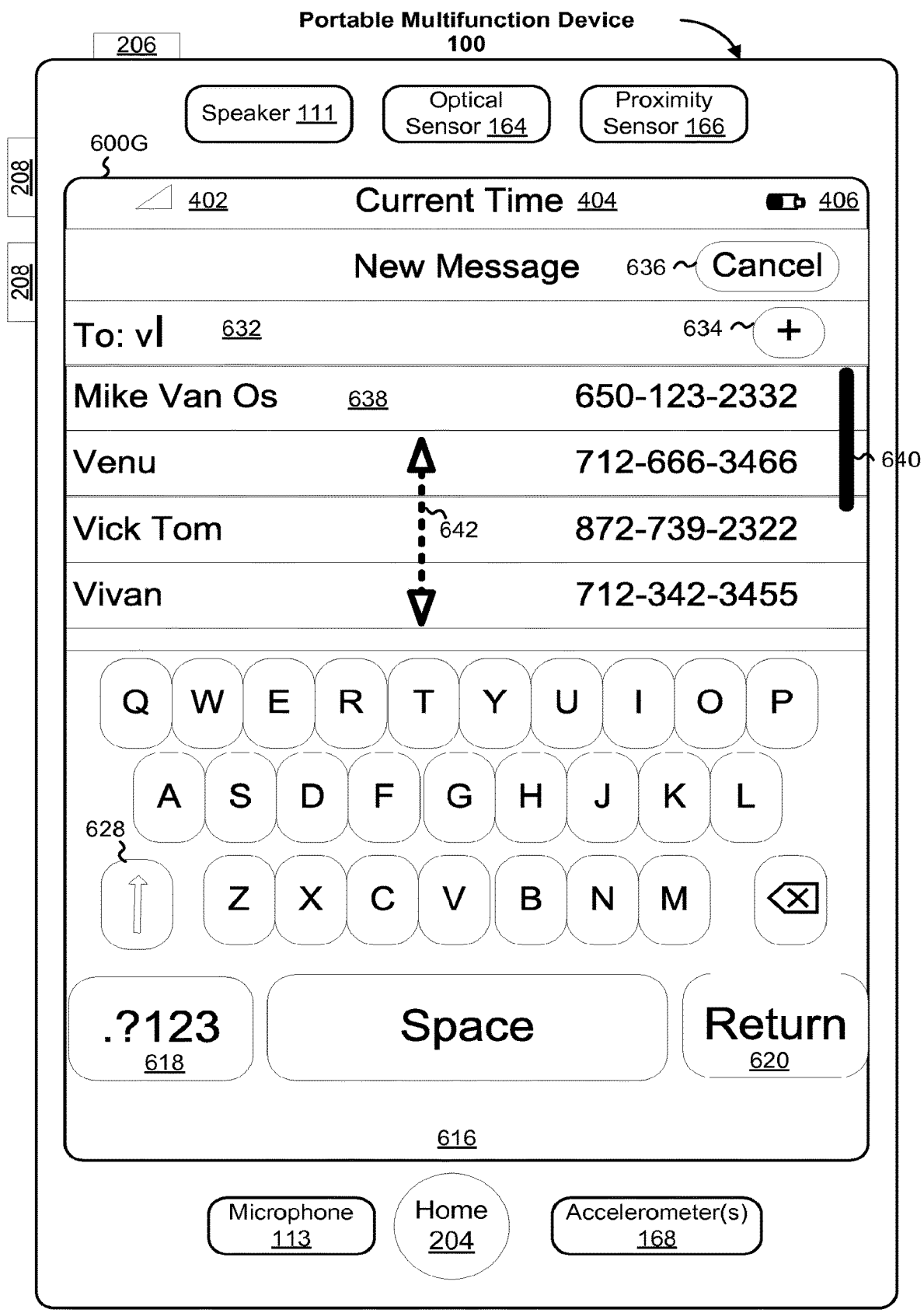
Figure 6H:

After completing a new message, the user sends the message by activating (e.g., with a finger gesture) the send message icon 614 or 620. FIG. 6E depicts such a user interface 600E that includes the following elements, or a subset or superset thereof:

402, 404, 406, 602, 604, 606, 608, 612, 614, 616, 618, and 620, as described above; and New instant message 606-3 sent to the other party.

In some embodiments, this user finger gesture triggers an animation of the new message moving from the text box 612 to the side of the message display region showing messages sent by the user of the device. For example, when the user activates a send key (e.g., either 614 or 620), the text in text box 612 "pops" or otherwise comes out of the box and becomes part of the string of user messages 606 to the other party. The black arrows in FIG. 6E illustrate an animated formation of a quote bubble 606-3. In some embodiments, the size of the quote bubble scales with the size of the message. In some embodiments, a sound is also made when the message is sent, such as a droplet sound, to notify the user.

Figure 15:
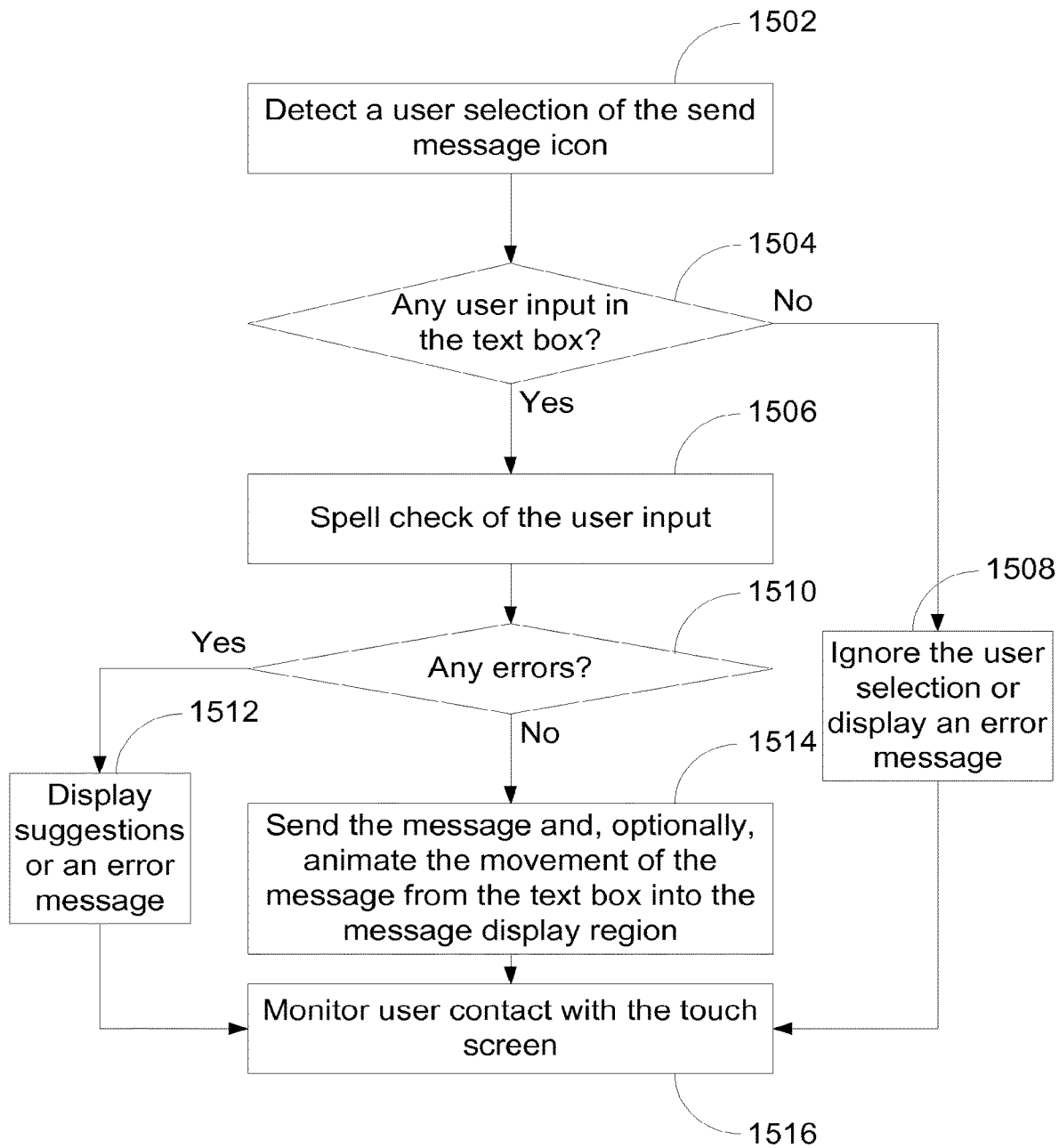
FIG. 15 is a flowchart illustrating a process for sending an instant message to a respective recipient in accordance with some embodiments.

FIG. 15 is a flowchart illustrating a process for sending an instant message to a respective recipient in accordance with some embodiments. In response to a user selection of the send message icon (1502), the portable electronic device checks if there is any user input in the text box (1504). If not, it may simply ignore the user's finger gesture on the send icon or display an error message on the touch screen (1508). In some embodiments, the visual appearance of the send icon 614 is changed (e.g., dimmed) if there is no user input in the text box.

If there is any user input in the text box (1504, yes), the portable electronic device may optionally conduct a spell check of the user input (1506). If there are any spelling errors (1506, yes), an error message and/or word suggestions are displayed on the touch screen for the user to choose (1512). If there are no spelling errors, the portable electronic device sends the message and may also animate the movement of the new message from the text box into the message display region (1514). The portable electronic device then monitors the user contact with the touch screen (1516).

In some embodiments, keys in keyboards 616 (FIGS. 6A, 6B, 6E-6K), 624 (FIG. 6C), and/or 639 (FIG. 6D) briefly change shape, shade and/or color when touched/activated by a user to help the user learn to activate the desired keys. In some embodiments, a user selection of any key on the touch screen by a finger gesture is accompanied by a sound for the same purpose. In some other embodiments, different sounds are associated with different types of keystrokes to indicate what keys have been "pressed" by the user. In some embodiments, an outline or shaded area corresponding to the user's finger contact is shown on the keyboard to help train the user.

In some embodiments, a user can delete an instant message from a conversation by finger tapping on the corresponding quote bubble in the message display region. The portable electronic device, in response, grays out the bubble and pops up a small window on the touch screen. The small window may include a "Yes" icon and a "No" icon. If the user re-affirms his decision of deleting the message by finger tapping on the "Yes" icon, the portable electronic device removes the bubble from the message display region. But if the user chooses the "No" icon, the quote bubble resumes its normal appearance.

In some embodiments, user interface 600F (FIG. 6F) includes the following elements, or a subset or superset thereof:
- 402, 404, 406, 612, 614, 616, 618, 620, and 628, as described above;
- Recipient input field 632 that when activated (e.g., by a finger tap on the field) receives and displays the phone number of the recipient of the instant message (or the recipient's name if the recipient is already in the user's contact list);
- Add recipient icon 634 that when activated (e.g., by a finger tap on the icon) initiates the display of a scrollable list of contacts (e.g., 638, FIG. 6G); and
- Cancel icon 636 that when activated (e.g., by a finger tap on the icon) cancels the new instant message.

In some embodiments, user interface 600G (FIG. 6G) includes the following elements, or a subset or superset thereof:
- 402, 404, 406, 612, 614, 616, 618, 620, 628, 632, 634, and 636, as described above;
- Scrollable list 638 of contacts that match the input in recipient input field 632; and
- Vertical bar 640 that helps a user understand how many items in the contact list that match the input in recipient input field 632 are being displayed.

In some embodiments, list 638 contains contacts that match the input in recipient input field 632. For example, if the letter "v" is input, then contacts with either a first name or last name beginning with "v" are shown. If the letters "va" are input in field 632, then the list of contacts is narrowed to contacts with either a first name or last name beginning with "va", and so on until one of the displayed contacts is selected (e.g., by a tap on a contact in the list 638).

In some embodiments, a user can scroll through the list 638 by applying a vertical swipe gesture 642 to the area displaying the list 638. In some embodiments, a vertically downward gesture scrolls the list downward and a vertically upward gesture scrolls the list upward, In some embodiments, vertical bar 640 is displayed temporarily after an object is detected on or near the touch screen display (e.g., a finger touch is detected anywhere on the list 638). In some embodiments, the vertical bar 640 has a vertical position on top of the displayed portion of the list that corresponds to the vertical position in the list of the displayed portion of the list. In some embodiments, the vertical bar 640 has a vertical length that corresponds to the portion of the list being displayed.

In some embodiments, user interfaces 600H (FIG. 6H) and 600I (FIG. 6I) include the following elements, or a subset or superset thereof:
- 402, 404, 406, 612, 614, 616, 618, 620, 628, 632, 634, and 636, as described above;
- Suggested word 644 adjacent to the word being input;
- Suggested word 646 in the space bar in keyboard 616; and/or
- Insertion marker 656 (e.g., a cursor, insertion bar, insertion point, or pointer).

In some embodiments, activating suggested word 644 (e.g., by a finger tap on the suggested word) replaces the word being typed with the suggested word 644. In some embodiments, activating suggested word 646 (e.g., by a finger tap on the space bar) replaces the word being typed with the suggested word 646. In some embodiments, a user can set whether suggested words 644 and/or 646 are shown (e.g., by setting a user preference).

In some embodiments, a letter is enlarged briefly after it is selected (e.g., "N" is enlarged briefly after typing "din" in FIG. 6H) to provide feedback to the user.

In some embodiments, user interfaces 600J (FIG. 6J) and 600K (FIG. 6K) include the following elements, or a subset or superset thereof:
- 402, 404, 406, 612, 614, 616, 618, 620, 628, 632, 634, 636, and 656 as described above; and
- Expanded portion 650 of graphics that helps a user adjust the position of an expanded insertion marker 657 (sometimes called an "insertion point magnifier");
- Expanded insertion marker 657; and
- Vertical bar 658 that indicates what portion of an instant message including multiple lines of text is being displayed.

In some embodiments, a finger contact 648-1 on or near the insertion marker 656 initiates the display of insertion point magnifier 650 and expanded insertion marker 657-1. In some embodiments, as the finger contact is moved on the touch screen (e.g., to position 648-2), there is corresponding motion of the expanded insertion marker (e.g., to 657-2) and the insertion point magnifier 650. Thus, the insertion point magnifier 650 provides an efficient way to position a cursor or other insertion marker using finger input on the touch screen. In some embodiments, the magnifier 650 remains visible and can be repositioned as long as continuous contact is maintained with the touch screen (e.g., from 648-1 to 648-2 to even 648-3).

Figure 6I:

In some embodiments, a portable electronic device displays graphics and an insertion marker (e.g., marker 656, FIG. 6I) at a first location in the graphics on a touch screen display (e.g., FIG. 6I). In some embodiments, the insertion marker 656 is a cursor, insertion bar, insertion point, or pointer. In some embodiments, the graphics comprise text (e.g., text in box 612, FIG. 6I).

A finger contact is detected with the touch screen display (e.g., contact 648-1, FIG. 6I). In some embodiments, the location of the finger contact is proximate to the location of the insertion marker. In some embodiments, the location of the finger contact is anywhere within a text entry area (e.g., box 612, FIG. 6I).

In response to the detected finger contact, the insertion marker is expanded from a first size (e.g., marker 656, FIG. 6I) to a second size (e.g., marker 657-1, FIG. 6J) on the touch screen display, and a portion (e.g., portion 650-1, FIG. 6J) of the graphics on the touch screen display is expanded from an original size to an expanded size.

In some embodiments, the portion of the graphics that is expanded includes the insertion marker and adjacent graphics. In some embodiments, after the insertion point and the portion of the graphics are expanded, graphics are displayed that include the insertion marker and adjacent graphics at the original size and at the expanded size.

Figure 6J:

Movement of the finger contact is detected on the touch screen display (e.g., from 648-1 to 648-2, FIG. 6J).

The expanded insertion marker is moved in accordance with the detected movement of the finger contact from the first location (e.g., 657-1, FIG. 6J) to a second location in the graphics (e.g., 657-2, FIG. 6J).

In some embodiments, the portion of the graphics that is expanded changes as the insertion marker moves from the first location to the second location (e.g., from 650-1 to 650-2, FIG. 6I). In some embodiments, the portion of the graphics that is expanded is displayed in a predefined shape. In some embodiments the portion (e.g., 650, FIG. 6J) of the graphics that is expanded is displayed in a circle. In some embodiments, the expanded insertion marker 657 is within the circle.

In some embodiments, the detected movement of the finger contact has a horizontal component on the touch screen display and a vertical component on the touch screen display. In some embodiments, moving the expanded insertion marker 657 in accordance with the detected movement of the finger contact includes moving the expanded insertion marker and the expanded portion of the graphics in accordance with the horizontal component of motion of the finger contact if the finger contact moves outside a text entry area without breaking contact. For example, in FIG. 6I, if the finger contact moves from 648-2 (inside the text entry area 612) to 648-3 (in the keyboard area), the expanded insertion point 657 and the expanded portion 650 of the graphics may move horizontally along the lower portion of the text entry area in accordance with the horizontal component of the movement from 648-2 to 648-3 (not shown).

In some embodiments, moving the expanded insertion marker in accordance with the detected movement of the finger contact includes moving the expanded insertion marker in a first area of the touch screen that includes characters entered using a soft keyboard (e.g., text box 612, FIG. 6J), wherein the soft keyboard is located in a second area of the touch screen that is separate from the first area (e.g., keyboard 616, FIG. 6J).

Figure 6K:

In some embodiments, the expanded insertion marker is contracted from the second size to the first size if finger contact with the touch screen display is broken (e.g., insertion marker 656, FIG. 6K). In some embodiments, the contracting includes an animation of the expanded insertion marker 657 shrinking into the insertion marker 656 at the second location.

In some embodiments, the expanded portion 650 of the graphics is contracted if finger contact with the touch screen display is no longer detected for a predetermined time.

A graphical user interface on a portable electronic device with a touch screen display comprises an insertion marker and graphics. In response to detecting a finger contact 648 with the touch screen display, the insertion marker is expanded from a first size 656 to a second size 657, and a portion 650 of the graphics is expanded. In response to detecting movement of the finger contact on the touch screen display, the expanded insertion marker is moved in accordance with the detected movement of the finger contact from a first location 657-1 in the graphics to a second location 657-2 in the graphics.

As noted above in connection with FIG. 6E, a user finger selection of the send key 614 triggers an animation of the message moving from the text box 612 to the message display region. In some embodiments, prior to sending the message, the size of the text box expands as text is entered (e.g., from one line of text in FIG. 6H to two lines of text in FIG. 6I). In some embodiments, the text box 612 does not have enough room for displaying the entire message if it has too many lines of text (as indicated by the short vertical bar 658). When a quote bubble containing the multi-line message comes out of the text box 612, it may gradually grow its size until a predefined condition is met (e.g., the bubble has enough room to contain the entire message and/or the size of the bubble reaches a threshold that is statically or dynamically determined by the device based on the number of existing messages in the conversation). For example, if the text box shows 3 lines of a 10 line instant message, then the quote bubble may grow from a 3 line quote bubble to a 10 line quote bubble during the animation that moves the message from the text box 612 to the message display region.

Additional description of insertion marker positioning can be found in U.S. patent application Ser. No. 11/553,436, "Method, System, And Graphical User Interface For Positioning An Insertion Marker In A Touch Screen Display," filed Oct. 26, 2006, the content of which is hereby incorporated by reference in its entirety.

Figure 7:
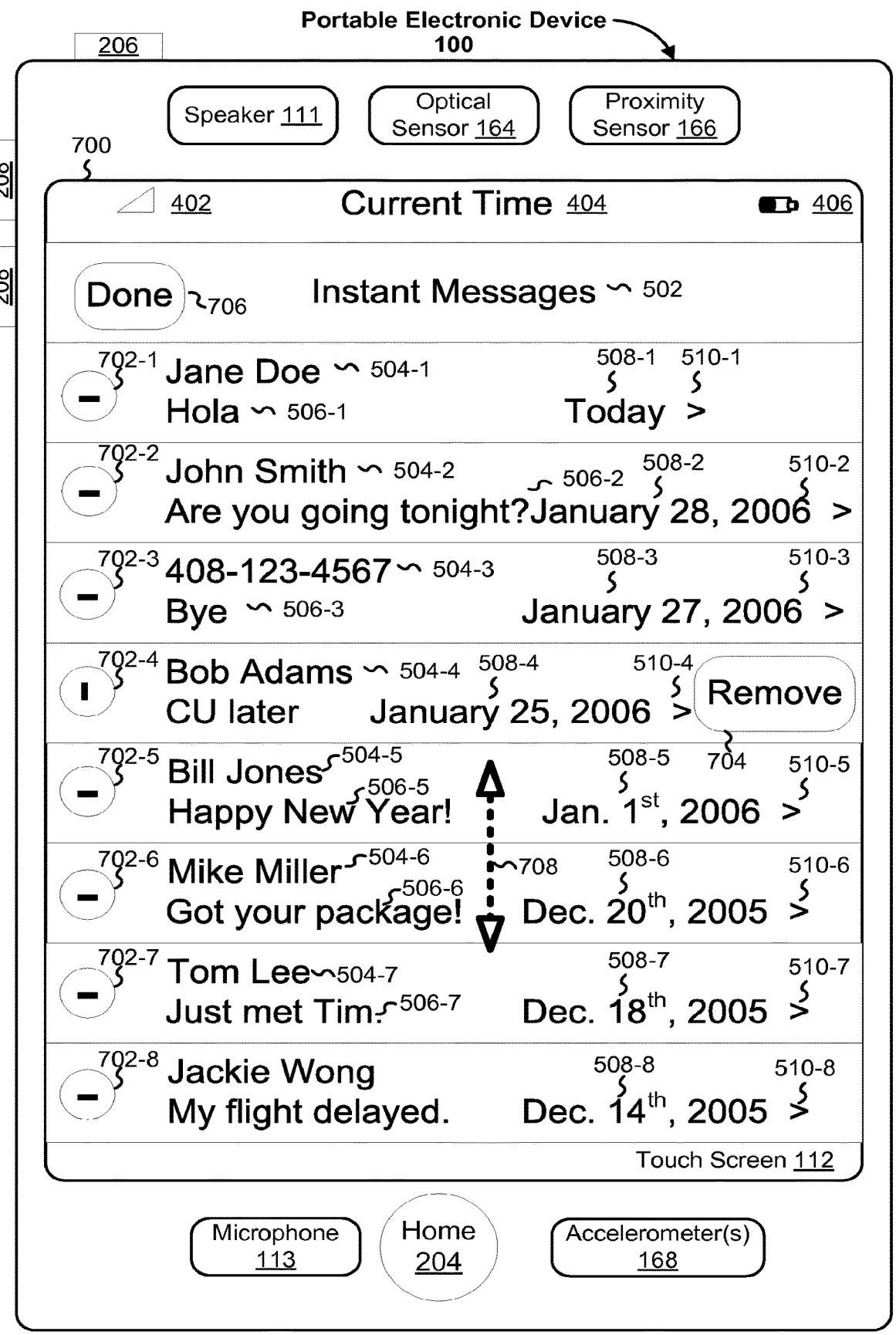
FIG. 7 illustrates an exemplary user interface for deleting an instant message conversation in accordance with some embodiments.

Besides deleting individual messages from a conversation, an entire conversation may be deleted via edit icon 512 in FIG. 5. FIG. 7 illustrates an exemplary user interface for deleting an instant message conversation in accordance with some embodiments. In some embodiments, user interface 700 includes the following elements, or a subset or superset thereof:

402, 404, 406, 504, 506, 508, 510, as described above;
Delete icons 702;
Remove icon 704; and
Done icon 706.

Figure 16:
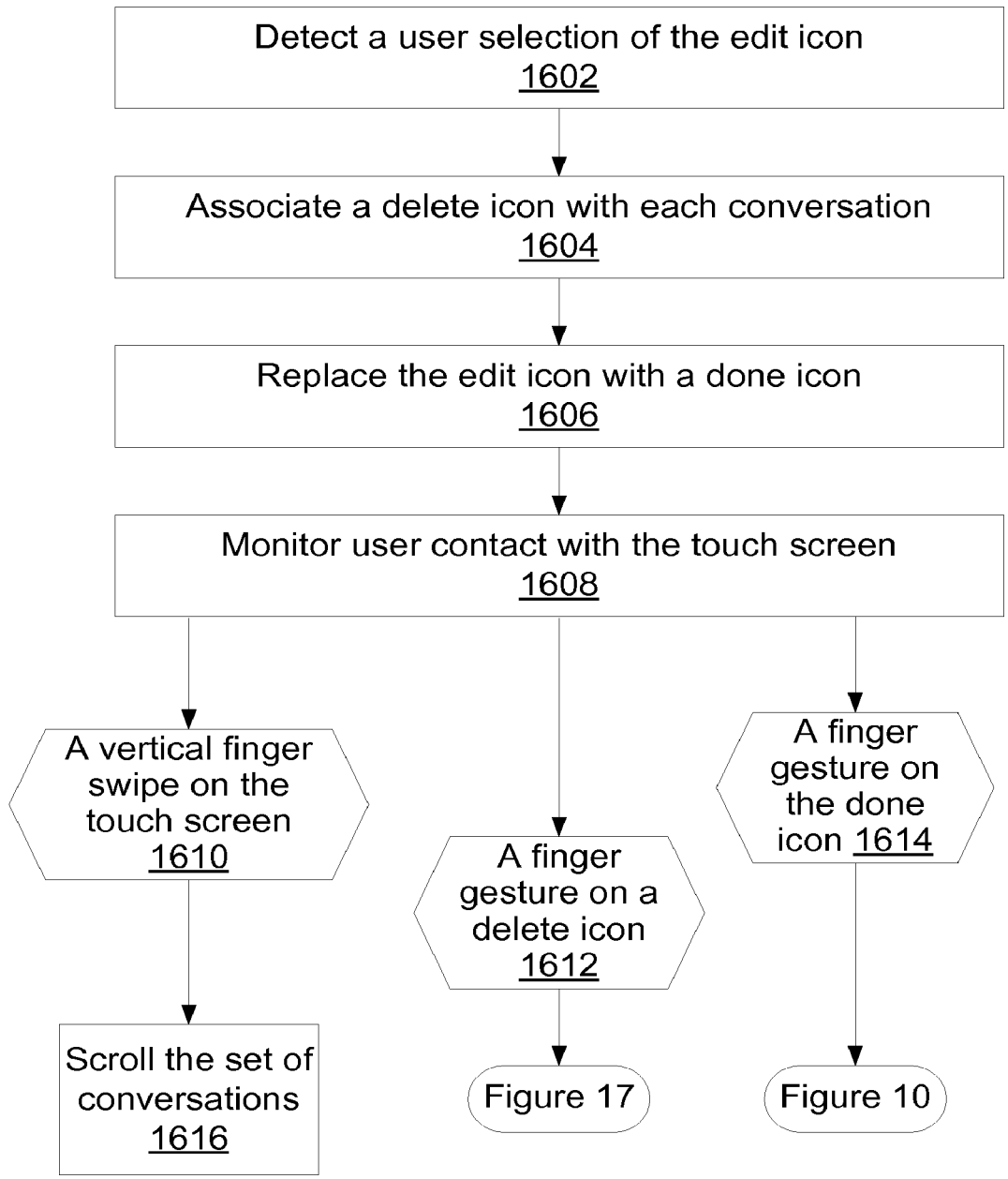
FIG. 16 is a flowchart illustrating a process for displaying a list of instant message conversations for editing in accordance with some embodiments.

FIG. 16 is a flowchart illustrating a process for displaying a list of instant message conversations for editing in accordance with some embodiments. Upon detecting a user selection of the edit icon 512 (1602), the portable electronic device associates a delete icon 702 with each conversation (1604) (e.g., a delete icon 702 appears next to each conversation). Additionally, the portable electronic device may replace the edit icon 512 with a done icon 706 (1606) and monitor user contact with the touch screen (1608).

If the user swipes his finger or stylus on the touch screen in a substantially vertical direction (1610), the portable electronic device scrolls the conversation list (1616). If a user activates a delete icon (e.g., with a finger gesture), the portable electronic device continues the deletion process for the corresponding conversation. A more detailed description of an exemplary conversation removal process is provided below in connection with FIGS. 17 and 18. But if the user touches the done icon, the portable electronic device removes all the delete icons 702 from the touch screen and brings back the conversation list UI as shown in FIG. 5.

Figure 17:
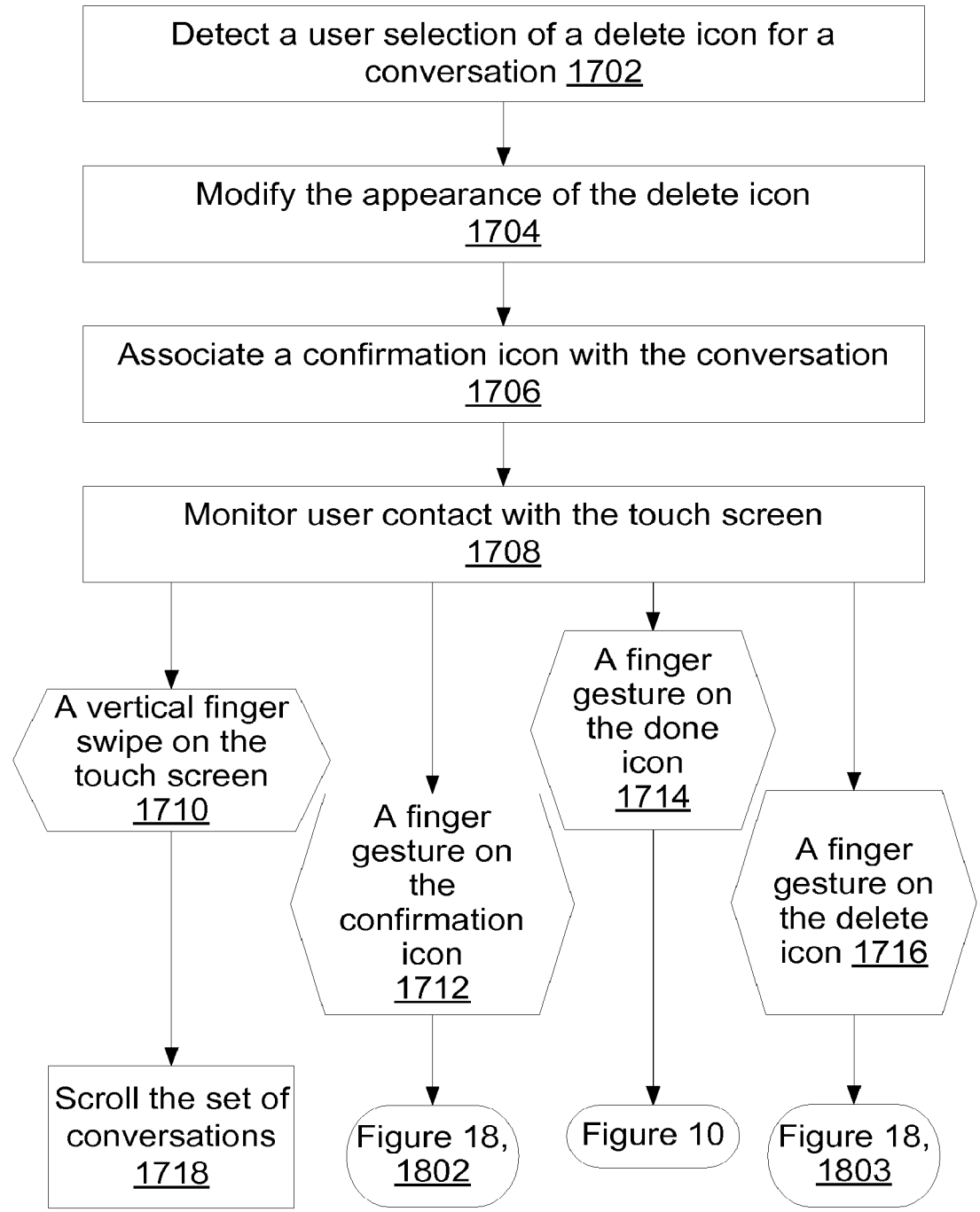
FIG. 17 is a flowchart illustrating a process for editing a user selected instant message conversation in accordance with some embodiments.

FIG. 17 is a flowchart illustrating a process for editing a user selected instant message conversation in accordance with some embodiments. Upon detecting a user selection of the delete icon associated with a conversation (1702), the portable electronic device changes the delete icon's appearance (e.g., rotating the selected delete icon 702-4, FIG. 7, by 90 degrees) (1704). The portable electronic device associates a confirmation icon (e.g., remove icon 704) with the selected conversation (1706). In some embodiments, during the editing process, at most one confirmation icon at a time is displayed on the touch screen. Depending on the next user contact with the touch screen (1708), the portable electronic device may perform different operations to the conversation list. For example, the device may scroll the list up/down in response to a scrolling gesture by the user (1710, 1718). The device may bring back the conversation list UI in response to a finger gesture on the done icon (1714).

Figure 18:
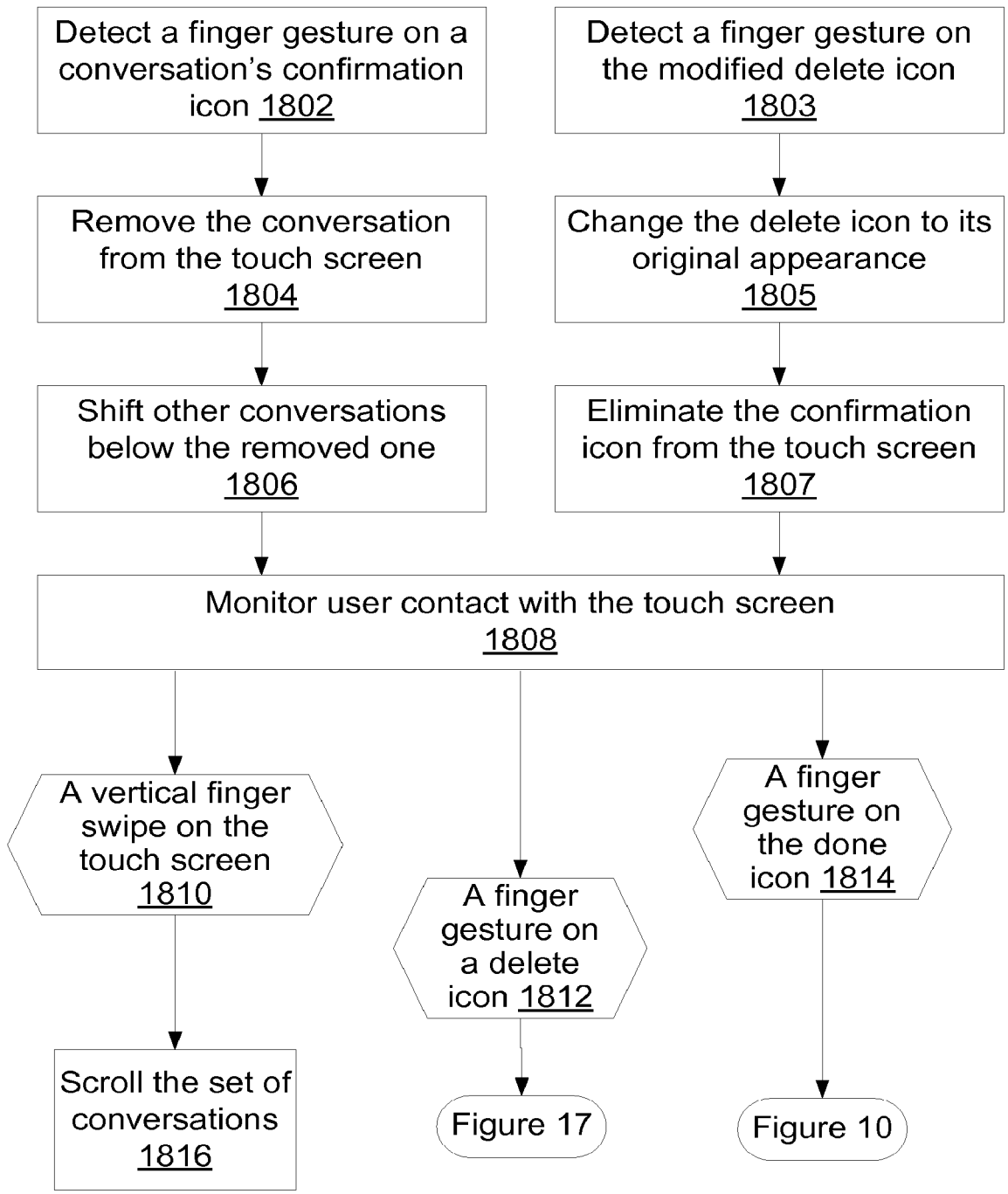
FIG. 18 is a flowchart illustrating a process for removing a user selected instant message conversation or exiting a conversation edit mode in accordance with some embodiments.

FIG. 18 is a flowchart illustrating a process for removing a user selected instant message conversation or exiting a conversation edit mode in accordance with some embodiments. If the user selects the confirmation icon (1712, 1802), the portable electronic device removes the conversation from the touch screen (1804). If the removed conversation is not the last one in the list, the portable electronic device may shift other conversations upward to fill the space left by the removed conversation (1806). A finger gesture on the modified delete icon 702-4 or, in some embodiments, anywhere on the touch screen besides the confirmation icon 704 (1716, 1803) indicates that the user decides not to delete the conversation. Accordingly, the portable electronic device changes the delete icon back to its original appearance (1805) and removes the confirmation icon from the touch screen (1807).

Following the operation 1806 or 1807, the portable electronic device resumes monitoring the user contact with the touch screen (1808). For example, the user may activate the done icon 706 (1814) by tapping on it with a finger when the user has finished deleting IM conversations and the device returns to UI 500. The user may delete another conversation by activating its associated delete icon (1812). If there is a long list of conversations that fill more than the screen area, the user may scroll through the list using vertically upward and/or vertically downward gestures 708 on the touch screen (1810, 1816).

This conversation removal process, which requires multiple gestures by the user on different parts of the touch screen (e.g., delete icon 702-4 and confirmation icon 704 are on opposite sides of the touch screen) can reduce the chance that a user accidentally deletes a conversation or other similar item.

Figure 19:
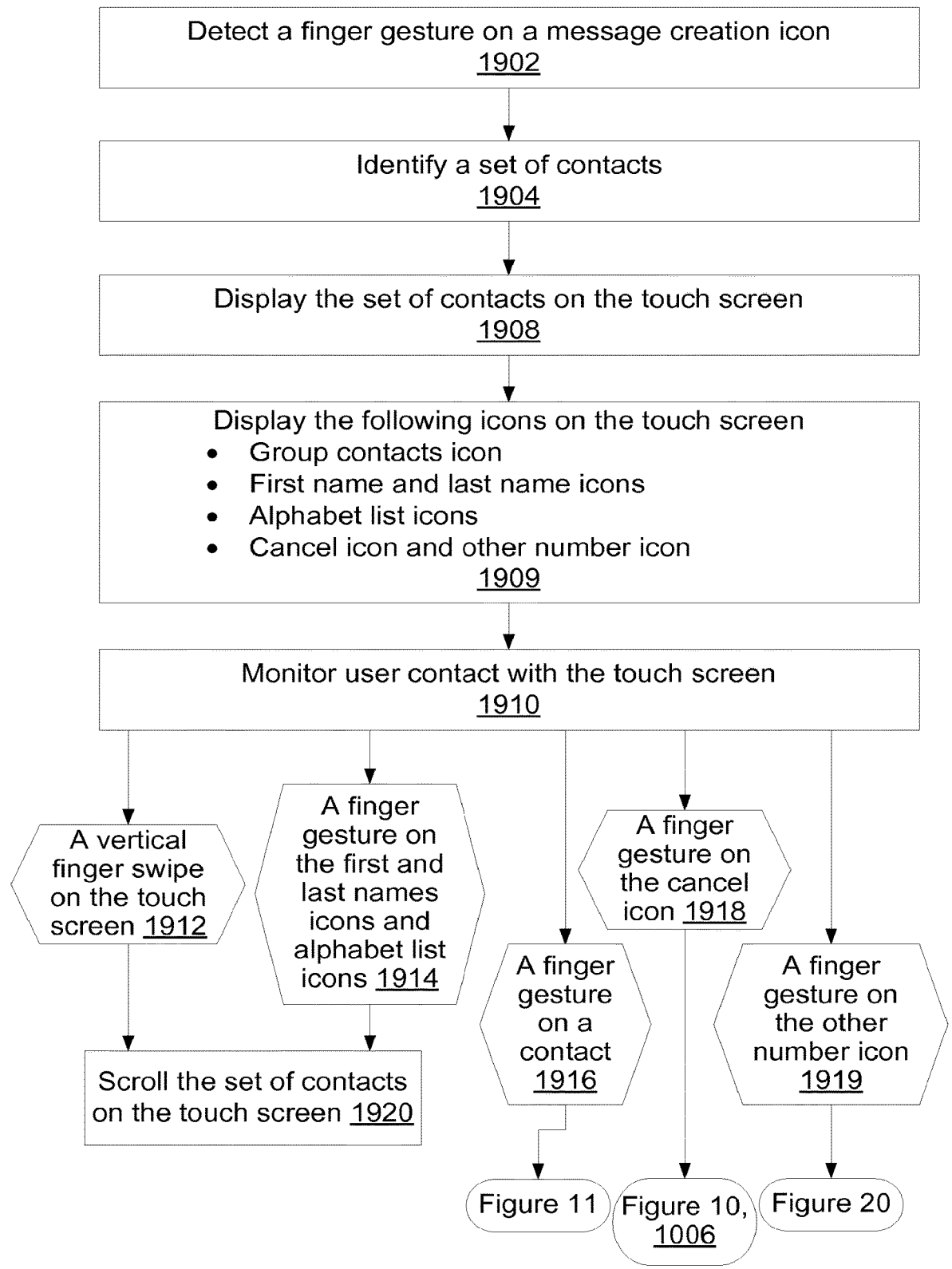
FIG. 19 is a flowchart illustrating a process for displaying a list of contacts from which a user chooses to send an instant message in accordance with some embodiments.

Referring again to FIG. 5, a user may start a new conversation with another person by activating the message creation icon 514 (e.g., with a finger tap or other gesture). FIG. 19 is a flowchart illustrating a process for displaying a list of contacts from which a user chooses to send an instant message in accordance with some embodiments. After detecting the user selection of the message creation icon (1902), the portable electronic device identifies a set of contacts from the user's address book or the equivalent because it does not know to whom this new conversation is directed (1904). Next, the portable electronic device displays the identified contacts on the touch screen (1908). In some embodiments, the portable electronic device displays multiple icons on the touch screen in addition to the contact list (1909), such as the group contacts icon, the first name and last name icons, the alphabet list icons, the cancel icon, and the other number icon. A more detailed description of these icons is provided below in connection with FIGS. 8A and 8B. After rendering the contact list and the additional icons, the portable electronic device then monitors the user contact with the touch screen (1910).

Figure 8A:
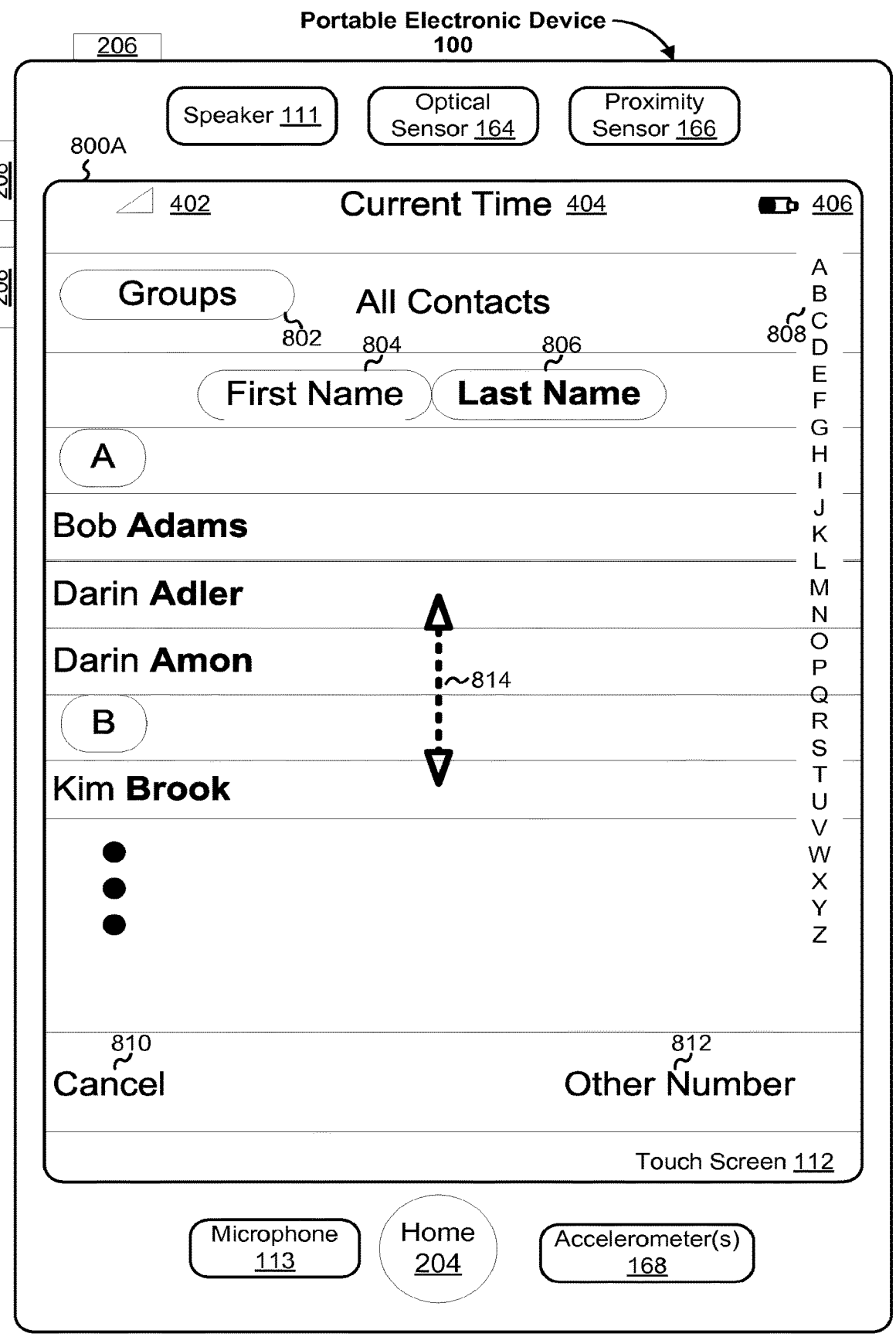
FIGS. 8A & 8B illustrate an exemplary user interface for a contact list in accordance with some embodiments.
Figure 8B:
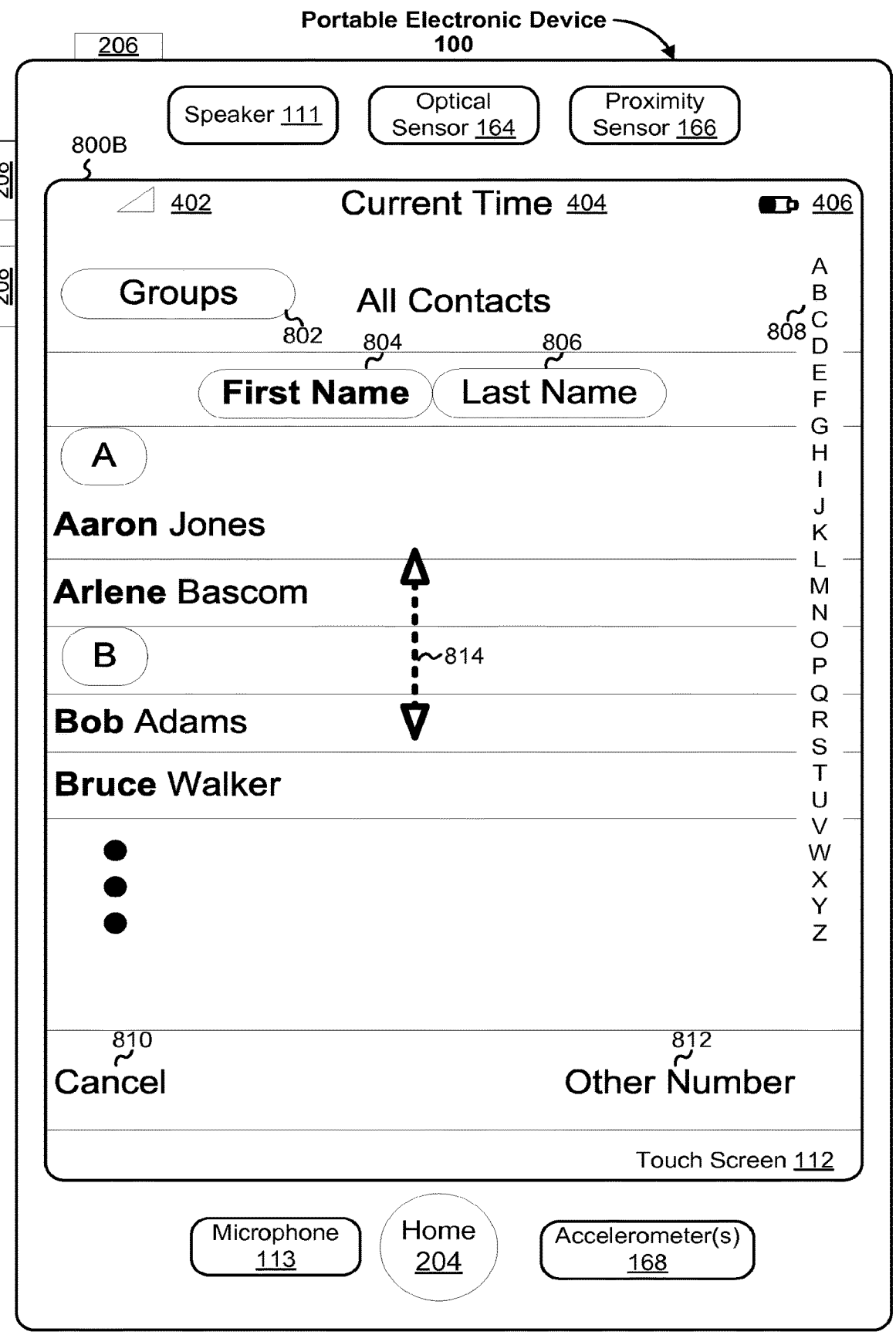
Figure 9:
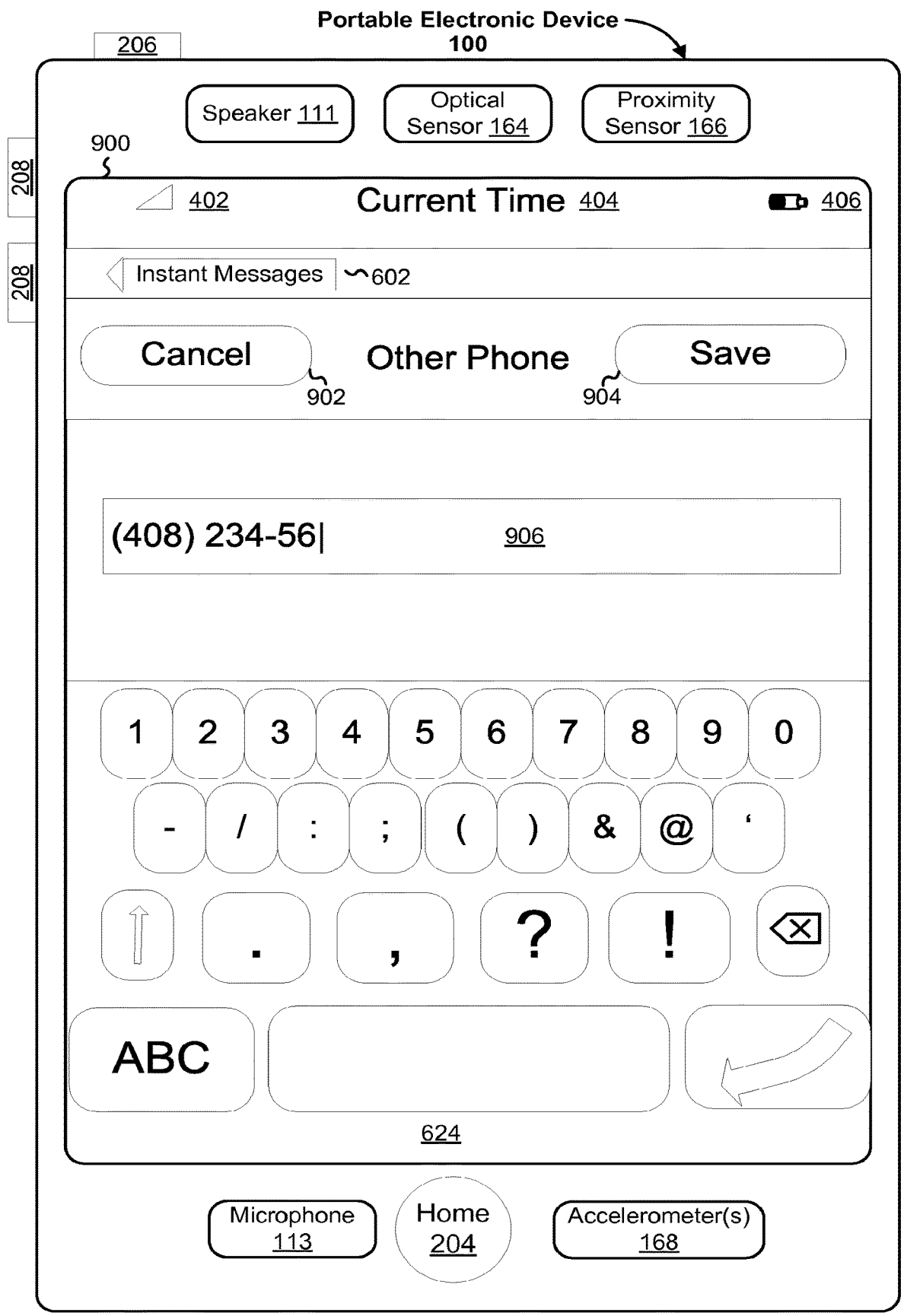
FIG. 9 illustrates an exemplary user interface for entering a phone number for instant messaging in accordance with some embodiments.

FIGS. 8A & 8B illustrate an exemplary user interface for a contact list in accordance with some embodiments. In some embodiments, user interfaces 800A and 800B include the following elements, or a subset or superset thereof:

402, 404, 406, as described above;

Groups icon 802 that when activated (e.g., by a finger gesture on the icon) initiates display of groups of contacts;

First name icon 804 that when activated (e.g., by a finger gesture on the icon) initiates an alphabetical display of the user's contacts by their first names (FIG. 8B);

Last name icon 806 that when activated (e.g., by a finger gesture on the icon) initiates an alphabetical display of the user's contacts by their last names (FIG. 8A);

Alphabet list icons 808 that the user can touch to quickly arrive at a particular first letter in the displayed contact list;

Cancel icon 810 that when activated (e.g., by a finger gesture on the icon) initiates transfer back to the previous UI (e.g., UI 500); and Other number icon 812 that when activated (e.g., by a finger gesture on the icon) initiates transfer to a UI for entering a phone number for instant messaging, such as a phone number that is not in the user's contact list (e.g., UI 900, FIG. 9).

As described in U.S. patent application Ser. No. 11/322,547, "Scrolling List With Floating Adjacent Index Symbols," filed Dec. 23, 2005, which is hereby incorporated by reference in its entirety, the user may scroll through the contact list using vertically upward and/or vertically downward gestures 814 on the touch screen.

If the next user contact is such a scrolling gesture 814 (1912) or a finger gesture on one of the first name icon 804, the second name icon 806 and the alphabet list icons 808 (1914), the portable electronic device modifies the contacts currently on display (1920). Although the contact list may be shared by multiple applications on the same portable device (e.g., email, phone, and instant messaging), a user selection of a name in the contact list in this context will be used for IM service because the contact list was requested from within the IM application. Here the contact list is being shown in connection with user activation of the message creation icon 514 in the IM application 141.

If the portable electronic device detects a finger gesture on one person's name or other identifier in the contact list (1916), the portable electronic device displays a message compose region for a message to the selected contact (1108, FIG. 11) and displays a conversation UI as shown in FIG. 6A. In some embodiments, if there is an existing conversation between the user and the selected person, the portable electronic device merges the new conversation into the existing one by displaying messages associated with the existing conversation.

If the portable electronic device detects a user gesture on the cancel icon 810 (1918), the portable electronic device aborts the process of creating the new conversation and brings back the conversation list shown in FIG. 5 (1006, FIG. 10).

If the portable electronic device detects a finger gesture on the other number icon 812 (1919), typically a new conversation with a person not in the contact list is initiated. Accordingly, the portable electronic device may render a new user interface for the user to enter the person's contact information that is going to be used by the new conversation.

Figure 20:
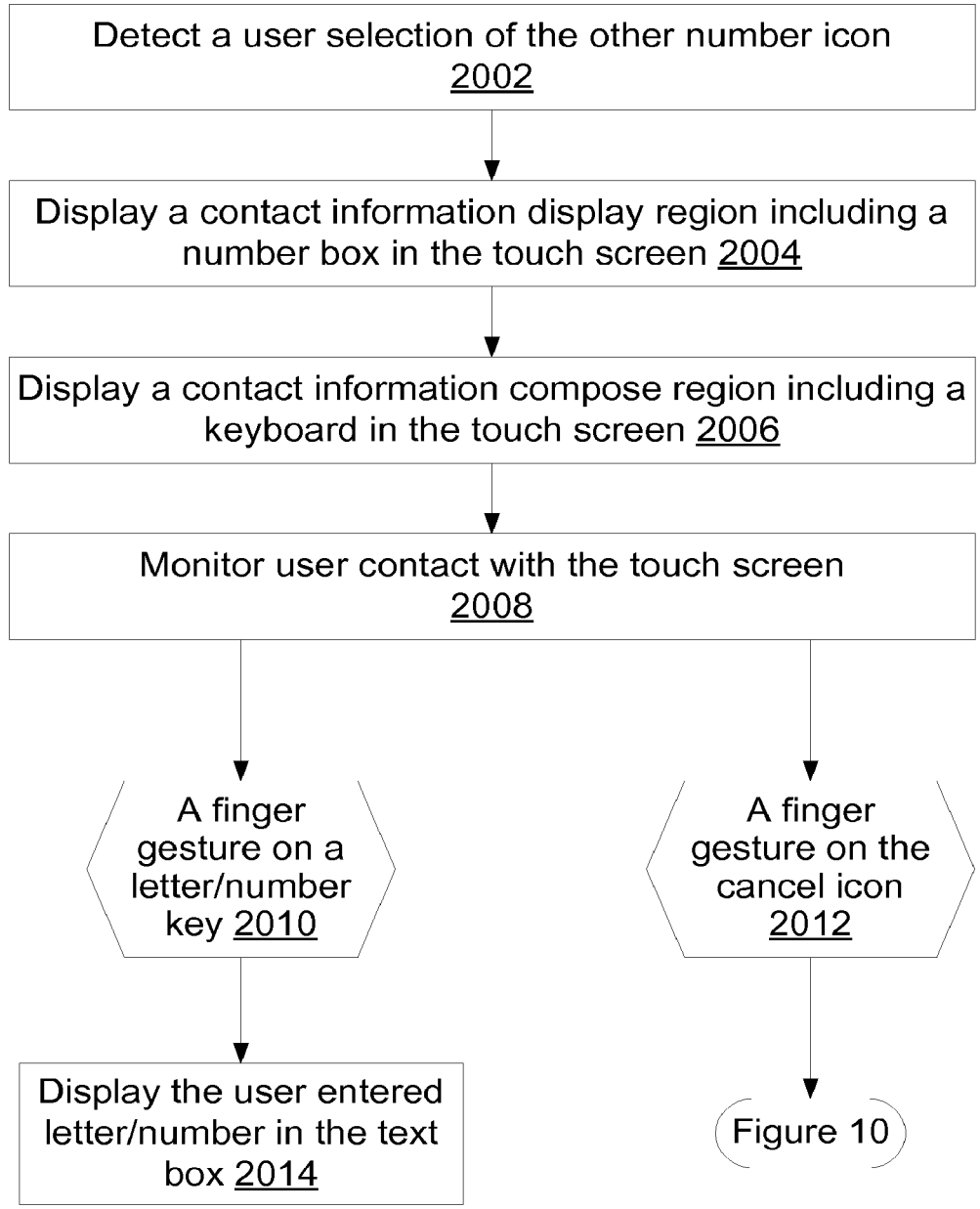
FIG. 20 is a flowchart illustrating a process for launching a new conversation using a new phone number in accordance with some embodiments.

FIG. 20 is a flowchart illustrating a process for launching a new conversation using a new phone number in accordance with some embodiments. Upon detecting user selection of the other number icon (2002), the portable electronic device provides a contact information display region (2004) and a contact information compose region (2006) on the touch screen. The contact information may be a phone number or an email address for IM service. The contact information display region includes a text box 906 for displaying the user-entered contact information. The contact information compose region includes a keyboard 624 for the user to enter such contact information. If the user activates the cancel icon (2012), the portable electronic device aborts the process of creating a new conversation and returns to the conversation list UI shown in FIG. 5. If the user input is a letter or number (2010), the portable electronic device displays it in the text box (2014).

FIG. 9 illustrates an exemplary user interface for entering a phone number for instant messaging in accordance with some embodiments. In some embodiments, user interface 900 includes the following elements, or a subset or superset thereof:

402, 404, 406, 602, and 624, as described above;

Cancel icon 902 that when activated (e.g., by a finger gesture on the icon) initiates transfer back to the previous UI (e.g., UI 800A or UI 800B);

Save icon 904 that when activated (e.g., by a finger gesture on the icon) initiates saving the entered phone number in the instant messages conversation list (e.g., UI 500) and displaying a UI to compose an instant message to be sent to the entered phone number (e.g., UI 600A); and Number entry box 906 for entering the phone number using keyboard 624.

Note that the keyboard displayed may depend on the application context. For example, the UI displays a soft keyboard with numbers (e.g., 624) when numeric input is needed or expected. The UI displays a soft keyboard with letters (e.g., 616) when letter input is needed or expected.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed:

1. A portable electronic device, comprising:
a display;
one or more processors; and
memory storing one or more programs configured to be executed by the one or more processors, the one or more programs including instructions for:
displaying, on the display, a message compose region comprising:
a text box for displaying characters of a message entered by a user;
a virtual keyboard having a plurality of keys for entering characters in the text box; and
a respective selectable user interface object with a respective position in the message compose region relative to the text box and the virtual keyboard;
receiving a selection input directed to the respective position in the message compose region at which the respective selectable user interface object was displayed; and
in response to receiving the selection input directed to the respective position in the message compose region:
in accordance with a determination that there is user input that includes one or more user-typed text characters in the text box, sending a message that includes the one or more user-typed text characters; and
in accordance with a determination that there is no user input in the text box, forgoing sending a message, wherein the appearance of the respective selectable user interface object at the respective position in the message compose region has a different appearance depending on whether or not there is user input in the text box.

2. The electronic device of claim 1, the one or more programs further including instructions for:
while displaying the message compose region, displaying a message display region including a set of messages exchanged between a user of the device and a first person, wherein sending the message that includes the one or more text characters includes updating the set of messages to include the message.

3. The electronic device of claim 2, wherein updating the set of messages to include the message includes displaying an animation of the message moving from the text box to the message display region.

4. The electronic device of claim 1, the one or more programs further including instructions for:
receiving selection of a respective key of the virtual keyboard, the respective key representing a respective character; and
in response to receiving selection of the respective key of the virtual keyboard, displaying word suggestions adjacent to the text box, wherein one or more of the word suggestions are based on the respective character.

5. The electronic device of claim 4, the one or more programs further including instructions for:
receiving selection of a respective word suggestion; and
in response to receiving selection of the respective word suggestion, replacing the respective character in the text box with the respective word suggestion.

6. A method, comprising:
at a portable electronic device with a display:
displaying, on the display, a message compose region comprising:
a text box for displaying characters of a message entered by a user;
a virtual keyboard having a plurality of keys for entering characters in the text box; and
a respective selectable user interface object with a respective position in the message compose region relative to the text box and the virtual keyboard;
receiving a selection input directed to the respective position in the message compose region at which the respective selectable user interface object was displayed; and
in response to receiving the selection input directed to the respective position in the message compose region:
in accordance with a determination that there is user input that includes one or more user-typed text characters in the text box, sending a message that includes the one or more user-typed text characters; and
in accordance with a determination that there is no user input in the text box, forgoing sending a message, wherein the appearance of the respective selectable user interface object at the respective position in the message compose region has a different appearance depending on whether or not there is user input in the text box.

7. A non-transitory computer readable storage medium storing one or more programs configured to be executed by one or more processors of a portable electronic device with a display, the one or more programs including instructions for:

displaying, on the display, a message compose region comprising:

a text box for displaying characters of a message entered by a user;

a virtual keyboard having a plurality of keys for entering characters in the text box; and a respective selectable user interface object with a respective position in the message compose region relative to the text box and the virtual keyboard;

receiving a selection input directed to the respective position in the message compose region at which the respective selectable user interface object was displayed; and in response to receiving the selection input directed to the respective position in the message compose region:

in accordance with a determination that there is user input that includes one or more user-typed text characters in the text box, sending a message that includes the one or more user-typed text characters; and in accordance with a determination that there is no user input in the text box, forgoing sending a message, wherein the appearance of the respective selectable user interface object at the respective position in the message compose region has a different appearance depending on whether or not there is user input in the text box.

8. The method of claim 6, further comprising:

while displaying the message compose region, displaying a message display region including a set of messages exchanged between a user of the device and a first person, wherein sending the message that includes the one or more text characters includes updating the set of messages to include the message.

9. The method of claim 8, wherein updating the set of messages to include the message includes displaying an animation of the message moving from the text box to the message display region.

10. The method of claim 6, further comprising:

receiving selection of a respective key of the virtual keyboard, the respective key representing a respective character; and in response to receiving selection of the respective key of the virtual keyboard, displaying word suggestions adjacent to the text box, wherein one or more of the word suggestions are based on the respective character.

11. The method of claim 10, further comprising:

receiving selection of a respective word suggestion; and in response to receiving selection of the respective word suggestion, replacing the respective character in the text box with the respective word suggestion.

12. The non-transitory computer readable storage medium of claim 7, the one or more programs further including instructions for:

while displaying the message compose region, displaying a message display region including a set of messages exchanged between a user of the device and a first person, wherein sending the message that includes the one or more text characters includes updating the set of messages to include the message.

13. The non-transitory computer readable storage medium of claim 12, wherein updating the set of messages to include the message includes displaying an animation of the message moving from the text box to the message display region.

14. The non-transitory computer readable storage medium of claim 7, the one or more programs further including instructions for:

receiving selection of a respective key of the virtual keyboard, the respective key representing a respective character; and in response to receiving selection of the respective key of the virtual keyboard, displaying word suggestions adjacent to the text box, wherein one or more of the word suggestions are based on the respective character.

15. The non-transitory computer readable storage medium of claim 14, the one or more programs further including instructions for:

receiving selection of a respective word suggestion; and in response to receiving selection of the respective word suggestion, replacing the respective character in the text box with the respective word suggestion.

\* \* \* \* \*